(12) United States Patent
Ohta

(10) Patent No.: US 7,424,460 B2
(45) Date of Patent: Sep. 9, 2008

(54) IMAGE ORDERING SYSTEM AND METHOD

(75) Inventor: Yoshinori Ohta, Yokohama (JP)

(73) Assignee: Fujifilm Corporation, Tokyo (JP)

( * ) Notice: Subject to any disclaimer, the term of this patent is extended or adjusted under 35 U.S.C. 154(b) by 1059 days.

(21) Appl. No.: 09/805,978

(22) Filed: Mar. 15, 2001

(65) Prior Publication Data

US 2002/0046039 A1    Apr. 18, 2002

(30) Foreign Application Priority Data

Mar. 17, 2000   (JP)   ............................. 2000-075296

(51) Int. Cl.
*H04L 9/00* (2006.01)
*H04K 1/00* (2006.01)
*G06F 3/12* (2006.01)
*G06F 15/00* (2006.01)
*G06K 1/00* (2006.01)
*G06K 15/00* (2006.01)
*H04N 1/60* (2006.01)

(52) U.S. Cl. .............................. 705/78; 705/79; 358/1.1; 358/1.9; 358/1.14; 358/1.15

(58) Field of Classification Search .................... 705/1, 705/26, 27, 50, 77, 78, 79; 358/1.1, 1.9, 358/1.14, 1.15
See application file for complete search history.

(56) References Cited

U.S. PATENT DOCUMENTS

| | | | | |
|---|---|---|---|---|
| 4,839,829 | A * | 6/1989 | Freedman ................... | 345/751 |
| 5,726,984 | A * | 3/1998 | Kubler et al. ............... | 370/349 |
| 5,799,219 | A * | 8/1998 | Moghadam et al. ......... | 396/319 |
| 5,897,260 | A * | 4/1999 | Zingher ...................... | 400/719 |
| 5,930,810 | A * | 7/1999 | Farros et al. ................ | 715/506 |
| 5,960,411 | A * | 9/1999 | Hartman et al. ............... | 705/26 |
| 6,018,338 | A * | 1/2000 | Greulich et al. ............. | 345/823 |
| 6,233,684 | B1 * | 5/2001 | Stefik et al. ................. | 713/176 |
| 6,336,100 | B1 * | 1/2002 | Yamada ....................... | 705/26 |

(Continued)

FOREIGN PATENT DOCUMENTS

JP    11-154218    6/1999

(Continued)

OTHER PUBLICATIONS

Print '91 prepress preview: expect a focus on color. Seybold Report on Publishing Systems, vol. 20, No. 22, p. 13(25), Aug. 23, 1991.*

(Continued)

*Primary Examiner*—Andrew J. Fischer
*Assistant Examiner*—Joshua Murdough
(74) *Attorney, Agent, or Firm*—McGinn IP Law Group, PLLC

(57) ABSTRACT

Order data is transmitted from a computer that has been installed at a travel agency to a center server. The order data is transmitted from the server to a photo lab. An order form is printed by an order-form printer located in the photo lab. Film having an image that complies with the order is found in a film library in accordance with the specifics written on the order form. The film that has been found is duplicated by a developing apparatus. The duplicated film and the order form are sealed in an envelope and mailed to the travel agency.

31 Claims, 42 Drawing Sheets

U.S. PATENT DOCUMENTS

| | | | |
|---|---|---|---|
| 6,529,286 B1* | 3/2003 | King | 358/1.14 |
| 6,552,813 B2* | 4/2003 | Yacoub | 358/1.1 |
| 6,570,640 B1* | 5/2003 | Garfinkle et al. | 355/40 |
| 2001/0017711 A1* | 8/2001 | Ishida | 358/1.15 |

FOREIGN PATENT DOCUMENTS

| | | |
|---|---|---|
| JP | 11-205503 | 7/1999 |
| JP | 11-296593 | 10/1999 |

OTHER PUBLICATIONS

Japanese Office Action dated Mar. 4, 2008, with English language translation.

\* cited by examiner

*Fig. 5*

TABLE OF USER NAMES

| USER ID | USER NAME | PASSWORD | EMAIL | TEL | FAX |
|---|---|---|---|---|---|
| 1 | EISUKE HANBA | ei&han&345 | eisuke@A-company.com | 03-5678- | 03-5678- |
| 2 | YOSHIHARU IIDA | yoshi&iii&123 | iida@A-Company.com | 03-5678- | 03-5678- |
| 3 | UOKICHI UOZUMI | fish@live%23 | uosumi@B-Company.com | 023-456- | 023-456- |
| 4 | SHIOKICHI KUJIRAI | whale&solt34 | kujirai@B-Company.com | 023-456- | 023-456- |
| 5 | KAMEKICHI KAMEYAMA | kame&nii213 | kameyama@kameyama.com | 012-3456- | 012-3456- |
| 6 | EKICHI SATO | eikiti&kame2 | eikiti@kameyama.com | 012-3456- | 012-3456- |

| NAME | OFFICE | DEPARTMENT | POST | ZIP CODE | MAILING ADDRESS |
|---|---|---|---|---|---|
| EISUKE HANBA | TOKYO HEADQUARTERS | BUSINESS TECHNOLOGY DP | CHIEF | 123- | NISHI-AZABU, MINATO-KU, TOKYO |
| YOSHIHARU IIDA | TOKYO HEADQUARTERS | BUSINESS TECHNOLOGY DP | — | 123- | NISHI-AZABU, MINATO-KU, TOKYO |
| UOKICHI UOZUMI | KOEI OFFICE | PRODUCTION TECHNOLOGY DP | MANAGER | 987- | KOEI, NIIGATA-SHI, NIIGATA-KEN |
| SHIOKICHI KUJIRAI | KOEI OFFICE | PRODUCTION TECHNOLOGY DP | MANAGER | 987- | KOEI, NIIGATA-SHI, NIIGATA-KEN |
| KAMEKICHI KAMEYAMA | NIIGATA BRANCH | FIRST BUSINESS DEPARTMENT | — | 905- | MINAMI SASAGUSHI, NIIGATA-SHI, NIIGATA-KEN |
| EKICHI SATO | NIIGATA BRANCH | FIRST BUSINESS DEPARTMENT | — | 905- | MINAMI SASAGUSHI, NIIGATA-SHI, NIIGATA-KEN |

Fig. 6

TABLE OF COMPANY - USER LINKAGE INFORMATION

| COMPANY ID | USER ID |
|---|---|
| 1 | 1 |
| 1 | 2 |
| 3 | 3 |
| 3 | 4 |
| 6 | 7 |
| 6 | 8 |

Fig. 7

TABLE OF COMPANY-USER LINKAGE INFORMATION

| COMPANY ID | COMPANY NAME | ZIP CODE | MAILING ADDRESS | REPRESENTATIVE | END OF FISCAL MONTH | TEL | FAX |
|---|---|---|---|---|---|---|---|
| 1 | A INC. | 123-4567 | NISHIAZABU, MINATO-KU, TOKYO | EITARO FUJI | 20 | 03-5678- | 03-5678- |
| 2 | Q INC. | 123-7890 | AKASAKA, MINATO-KU, TOKYO | FUJIO TOU | 20 | 03-3456- | 03-3456- |
| 3 | B INC. | 234-5678 | AGEO-CHO, YOKOHAMA-SHI, KANAGAWA-KEN | TARO OKEGAMI | 20 | 045-678- | 045-678- |
| 4 | X INC. | 678-9012 | NIJO, CYUKYO-KU, KYOTO-SHI, KYOTO | TARO KYOU | 20 | 078-901- | 078-901- |
| 5 | Z INC. | 690-1234 | SODE-CHO, MATUE-SHI, SHIMANE-KEN | SHINTARO MATUE | 20 | 0890-12- | 0890-12- |
| 6 | KAMEYAMA TOURIST INC. | 987-6543 | KOUEI, NIIGATA-SHI, NIIGATA-KEN | YOSHIO SATO | 20 | 023-456- | 023-456- |
| 7 | PLATINUM TRAVEL INC. | 567-8901 | NISHINAKAJIMA, YODOGAWA-KU, OOSAKA-SHI | SHIRO YODO | 20 | 06-789-0123 | 06-789-1234 |
| 8 | JAPAN TRAVEL INC. | 345-6789 | AKANUMA, SUWA-SHI, NAGANO-KEN | DAISUKE SUWA | 20 | 0234-67- | 0234-67- |

Fig. 8

TABLE OF COMPANY MASTER- SLAVE INFORMATION

| MASTER COMPANY ID | SLAVE COMPANY ID |
|---|---|
| 0 | 1 |
| 0 | 2 |
| 1 | 3 |
| 1 | 4 |
| 1 | 5 |
| 3 | 6 |
| 3 | 7 |
| 3 | 8 |

Fig. 9

TABLE FOR SETTING SYSTEM SERVICES

| COMPANY ID | MAXIMUM UTILIZABLE KILOBYTES | BASIC MONTHLY FEE FOR SERVER UTILIZATION | KILOBYTE UNIT PRICE | USER MAINTENANCE FEE UNIT PRICE |
|---|---|---|---|---|
| 0 | 1,000,000 | 50,000 | 1 | 5,000 |
| 1 | 500,000 | 25,000 | 1.5 | 7,500 |
| 2 | 500,000 | 25,000 | 1.5 | 7,500 |
| 3 | 600,000 | 30,000 | 2 | 5,000 |
| 4 | 600,000 | 30,000 | 2 | 5,000 |
| 5 | 600,000 | 30,000 | 2 | 5,000 |
| 6 | 100,000 | 0 | 0 | 0 |
| 7 | 100,000 | 0 | 0 | 0 |
| 8 | 100,000 | 0 | 0 | 0 |

*Fig. 10*

PRINTING SERVICE SETTING

| COMPANY ID | SERVICE ID | SERVICE NAME | BASIC CHARGE | ORDINARY UNIT PRICE | URGENT-DELIVERY UNIT PRICE | CONSIGNEE SERVICE |
|---|---|---|---|---|---|---|
| 6 | 1 | L PRINT | 200 | 100 | 200 | YES |
| 6 | 2 | DSC PRINT | 200 | 100 | 200 | YES |
| 6 | 3 | NEGATIVE DUPLICATION | 300 | 300 | 450 | YES |
| 6 | 4 | SLIDE | 300 | 400 | 600 | YES |
| 4 | 5 | L-SIZE PRINT | 150 | 80 | 160 | YES |
| 4 | 6 | SERVICE-SIZE PRINT | 150 | 50 | 100 | YES |
| 4 | 7 | NEGATIVE SERVICE | 400 | 400 | 600 | YES |
| 4 | 8 | SLIDE DUPLICATION SERVICE | 400 | 400 | 600 | YES |

Fig. 11

ORDER TABLE

| ORDERING USER ID | SERVICE ID | PRODUCT NO. | QUANTITY ORDERED | URGENT DELIVERY SERVICE |
|---|---|---|---|---|
| 5 | 1 | 00108-4 | 3 | YES |
| 5 | 4 | 00001-1 | 2 | NO |
| 6 | 3 | 01234-5 | 3 | YES |

| ORDER DATE | PLANNED DELIVERY DATE | PAYMENT CATEGORY | ORDER FORM ISSUED? | CONSIGNEE ID |
|---|---|---|---|---|
| 1/27/2000:10:23:21 | 1/29/2000 | MONTHLY LUMP SUM | YES | 1 |
| 1/27/2000:10:23:21 | 2/1/2000 | MONTHLY LUMP SUM | YES | 0 (NONE) |
| 1/29/2000:15:41:45 | 2/1/2000 | CASH ON DELIVERY | NO | 2 |

*Fig. 12*

PRODUCT TABLE

| PRODUCT NO. | PRODUCT NAME | PRODUCT DESCRIPTION | THUMBNAIL FILE URL | IMAGE FILE URL |
|---|---|---|---|---|
| 00000-0 | ASO-SAN | ASO CRATER; PHOTOGRAPHED BY GROSS | http://xxx.com/S00.jpg | http://xxx.com/00.jpg |
| 00001-0 | RISHIRI-SAN | VIEW OF RISHIRI-SAN; PHOTOGRAPHED BY KEN | http://xxx.com/S01.jpg | http://xxx.com/01.jpg |
| ... | ... | ... | ... | ... |

| SEARCH KEYWORD #1 | SEARCH KEYWORD #2 | SEARCH KEYWORD #3 | SEARCH KEYWORD #4 | SEARCH KEYWORD #5 |
|---|---|---|---|---|
| VOLCANO | KUMAMOTO | HINOKUNI | YAMANAMI HIGHWAY | DAISOUGEN |
| SNOW-COVERED MOUNTAIN | HOKKAIDO | RISHIRIFUJI | RISHIRI KONBU | KITANOSHIMA |
| ... | ... | ... | ... | ... |

*Fig. 13*

TABLE OF CONSIGNEE IDs

| CONSIGNEE ID | NAME | COMPANY NAME | DEPARTMENT | POST | ZIP CODE |
|---|---|---|---|---|---|
| 1 | UMIO KAMEUMI | KAMEUMI PRINTING INC. | DESIGN OFFICE | CHIEF | 012-3456 |
| 2 | WASHI TSURUSHIMA | TSURUSHIMA DESIGN INC. | GRAPHICS SECTION | | 345-6788 |

| MAILING ADDRESS | EMAIL | TEL | FAX |
|---|---|---|---|
| IZUMI-KU, CHUO, SENDAI-SHI, MIYAGI-KEN | hameumi@kameumi.com | 023-456-7890 | 023-456-7891 |
| MINAMI-KU, HIROSHIMA-SHI, HIROSHIMA-KEN | turusima@turusima.com | 089-123-4567 | 089-123-4569 |

Fig. 14      SERVICE SETTING

Fig. 20

| | | W4 |
|---|---|---|
| COMPANY NAME | KAMEYAMA TOURIST INC. | |
| ZIP CODE | 987 - 6543 | |
| MAILING ADDRESS | KOUEI, NIIGATA-SHI, NIIGATA-KEN | A10 |
| REPRESENTATIVE | YOSHIYUKI SATO | |
| END OF FISCAL MONTH | 20 DAY | |
| TEL | 023 - 456 - 7890  FAX  023 - 456 - 7891 | |

| | | |
|---|---|---|
| MAXIMUM UTILIZABLE KILOBYTES | 1,000,000 | KByte |
| BASIC MONTHLY FEE FOR SERVER UTILIZATION | 30,0000 | YEN |
| KILOBYTE UNIT PTICE | 2 | YEN |
| USER MAINTENANCE FEE UNIT PRICE | 5,000 | YEN |

SET SERVICE   ADD  /A10a

| SERVISE | BASIC CHARGE | ORDINARY UNIT PRICE | UEGENT DELIVERY UNIT PRICE | |
|---|---|---|---|---|
| SLIDE | 300 YEN | 400 YEN | 600 YEN | CHANGE |
| NEGATIVE DUPLICATION | 300 YEN | 300 YEN | 450 YEN | CHANGE |
| L PRINT | 200 YEN | 100 YEN | 200 YEN | CHANGE |
| DSC PRINT | 200 YEN | 100 YEN | 200 YEN | CHANGE |

CONSIGNEE SERVICE DESIGNATED?  ● YES   ○ NO   — A21

USER   ADD /A12

| USER NAME | KAMEKICHI KAMEYAMA | PASSWORD | ****** | CHANGE | DELETE |
|---|---|---|---|---|---|
| USER NAME | UMISUKE UMIKAME | PASSWORD | ****** | CHANGE | DELETE |

A13                                      OK    RETURN
                                         A17   A18

ADD SERVICE

| | | |
|---|---|---|
| SERVICE NAME | [         A22         ] | |
| BASIC CHARGE | [         A23         ] | YEN |
| ORDINARY UNIT PRICE | [         A24         ] | YEN |
| URGENT DELIVERY UNIT PRICE | [         A25         ] | YEN |

[ ADD ]—A26    [ RESET ]—A27

W5

Fig. 22  FILM ORDER

| | | |
|---|---|---|
| DESIGNATE CONSIGNEEE | | |
| NAME | UMIO KAMEUMI | |
| COMPANY NAME | KAMEUMI PRINT CO. | A57 |
| DEPARTMENT | DESIGN | |
| POST | CHIEF | |
| ZIP CODE | 012 - 3456 | |
| MAILING ADDRESS | CHU-O, IZUMI-KU, SENDAI-SHI, MIYAGI-KEN | A58 |
| TEL | 023 - 456 - 7890 | |
| FAX | 023 - 456 - 7891 | |
| EMAIL | kameumi@kameumi.com | |
| PAYMENT METHOD | LUMP SUM BY 20TH OF MONTH ▽ | A59 |
| | O K    CANCEL | |

| W12 | NUMBER OF RECEIVE ORDERS | | | A64 |
|---|---|---|---|---|
| KAMEYAMA TOURIST INC. | TWO | ORDINARY DELIVERY | ONE | VIEW SPECIFICS LIST |
| | | URGENT DELIVERY | ONE | |
| PLATINUM TRAVEL INC. | THREE | ORDINARY DELIVERY | TWO | VIEW SPECIFICS LIST |
| | | URGENT DELIVERY | ONE | |
| JAPAN TRAVEL INC. | EIGHT | ORDINARY DELIVERY | EIGHT | VIEW SPECIFICS LIST |
| | | URGENT DELIVERY | ZERO | |

VIEW URGENT-DELIVERY LIST — A65

Fig. 31

| KAMEYAMA TOURIST INC. |
|---|

KAMEYAMA TOURIST INC.; NIIGATA BRANCH; FIRSTBUSINESS DEPARTMENT;
KAMEKICHI KAMEYAMA

URGENT ORDER

A66

| PRODUCT NO. | 00108-4 | SERVICE | L PRINT |
| PRODUCT NAME | MEDITERRANEAN SEA | UNIT PRICE | 200 YEN |
| PRODUCT DESCRIPTION | GROSS | NUMBER OF PRINTS | 3 |
| | | SUBTOTAL | 800 YEN |

ORDINARY ORDER

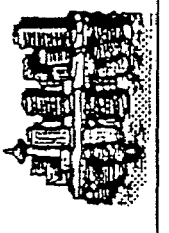

A66

| PRODUCT NO. | 00001-1 | SERVICE | SLIDE |
| PRODUCT NAME | HAMBURG | UNIT PRICE | 400 YEN |
| PRODUCT DESCRIPTION | YOSHI | NUMBER OF PRINTS | 2 |
| | | SUBTOTAL | 1,200 YEN |

[OUTPUT ORDER FORM] A67

URGENT DELIVERY ORDERS

KAMEYAMA TOURIST INC.; NIIGATA BRANCH; FIRST BUSINESS DEPARTMENT; KAMEKICHI KAMEYAMA

| PRODUCT NO. | 001084 | SERVICE | L PRINT |
|---|---|---|---|
| PRODUCT NAME | MEDITERRANIAN SEA | UNIT PRICE | 200 YEN |
| PRODUCT DESCRIPTION | GROSS | NUMBER OF PRINTS | 3 |
| | | SUBTOTAL | 800 YEN |

PLATINUM TRAVEL INC.; PRODUCT DEVELOPMENT; TARO SHIROGANE

| PRODUCT NO. | 01123-1 | SERVICE | L PRINT |
|---|---|---|---|
| PRODUCT NAME | ASUKA | UNIT PRICE | 200 YEN |
| PRODUCT DESCRIPTION | ASUKA | NUMBER OF PRINTS | 3 |
| | | SUBTOTAL | 800 YEN |

[ OUTPUT ORDERS ] — A67

CHECK PROCESSED ORDERS

| | | | |
|---|---|---|---|
| LIST OF MONTHLY ORDERS | YEAR | | MONTH |
| DATE ORDER RECEIVED | 1/15/2000 | ~ | 1/16/2000 |
| DELIVERY | | ~ | |
| COMPANY NAME | KAMEYAMA TOURIST INC. ▽ | | |
| REQUESTER | KAMEKICHI KAMEYAMA | | |
| CONSIGNEE | | | |
| SERVICE | SLIDE ▽ | | |
| URGENT DELIVERY SERVICE | ● YES  ○ NO | | |
| PRODUCT NO. | | | |
| PRODUCT NAME | | | |
| PRODUCT DESCRIPTION | | | |

[ SEARCH ]  [ RETURN ]

DATE OF ORDER-FORM OUTPUT; 1/15/2000; SATURDAY; 13:22:12

A72 — CHECK SEARCH CONDITION

| PRODUCT NO. | 02113-8 | SERVICE | L PRINT |
| PRODUCT NAME | LINE RIVER | UNIT PRICE | 600 YEN |
| PRODUCT DESCRIPTION | GROSS | NUMBER OF PRINTS | 3 |
| | | SUBTOTAL | 2,100 YEN |

A71

DATE OF ORDER-FORM OUTPUT; 1/15/2000; SATURDAY; 13:24:42

| PRODUCT NO. | 00108-4 | SERVICE | L PRINT |
| PRODUCT NAME | STATUE OF LIBERTY | UNIT PRICE | 600 YEN |
| PRODUCT DESCRIPTION | MICHEL | NUMBER OF PRINTS | 1 |
| | | SUBTOTAL | 900 YEN |

OUTPUT ORDER FORM AGAIN — A73

*Fig. 35*

| SEARCH CONDITIONS | A74 |
|---|---|
| ORDER DATE | 1/15/2000 ~ 1/16/2000 |
| COMPANY NAME | KAMEYAMA TOURIST INC. |
| REQUESTER | KAMEKICHI KAMEYAMA |
| SERVICE | SLIDE |
| URGENT DELIVERY SERVICE | YES |

W17

GO TO SEARCH SCREEN    O K

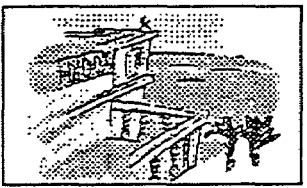

W31

| FILM ORDER FORM (URGENT) | |
|---|---|
| PRINT DATE AND TIME; 1/27/2000; THURSDAY; 13:21:31 | A80 |
| ORDER DATE; 1/27/2000; THURSDAY; 10:23:21 | A81 |
| REQUESTER  KAMEYAMA TOURIST INC.; NIIGATA BRANCH, FIRST BUSINESS DEPARTMENT; KAMEKICHI KAMEYAMA 〒950-1234  MINAMISASAGUCHI, NIIGATA-SHI, NIIGATA-KEN       TEL 012-3456-7890       FAX 012-3456-7891       EMAIL kameyama@kameyama.com | A82 |
| DELIVERY DATE; 1/28/2000; 10:00; (URGENT DELIVERY SERVICE) | A83 |
| CONSIGNEE  KAMEUMI PRINTING INC.; DESIGN OFFICE; CHIEF; KAMEO KAMEUMI 〒012-3456   CYUO, IZUMI-KU, SENDAI-SHI, MIYAGI-KEN       TEL 023-456-7890       FAX 023-456-7891       EMAIL kameumi@kameumi.com | A84 |
| SERVICE   L PRINT; BASIC CHARGE: 200 YEN   UNIT PRICE 200 YEN (URGENT DELIVERY SERVICE); QUANTITY: 3                                           SUBTOTAL:  800 YEN PAYMENT CATEGORY: LUMP SUM BY 20TH OF MONTH | A85 |
| PRODUCT NO. 00108-4  PRODUCT NAME   MEDETERIAN SEA  PRODUCT DESCRIPTION   GROSS | A86 |
| KAMEYAMA TOURIST INC.; MIIGATA BRANCH; FIRST BUSINESS DEPARTMENT; KAMEKICHI KAMEYAMA; YOUR ORDER   (1/2) | |

*Fig. 43*

|  | W22 |
|---|---|
| A112 — KAMEYAMA / PLATINUM / JT | |
| BILLING SPECIFICS FOR KAMEYAMA TOURIST INC. | |
| A100 — BASIC MONTHLY FEE FOR SYSTEM UTILIZATION: | 30,000 YEN |
| A114 — TOTAL COST OF MATERIALS CREATION: | 45,000 YEN |
| A115 — ORDINARY DELIVERY; L PRINT (80 PRINTS / 20 ORDERS) | 12,000 YEN |
| URGENT DELIVERY; L PRINT (20 PRINTS / 10 ORDERS) | 6,000 YEN |
| ORDINARY DELIVERY; SLIDE (30 PRINTS / 20 ORDERS) | 18,000 YEN |
| ORDINARY DELIVERY; SLIDE (10 PRINTS / 10 ORDERS) | 9,000 YEN |
| A116 — | DOWNLOAD STATEMENT |
| A101 — NUMBER OF SERVER KILOBYTES UTILIZED: | 8,023 KB |
| KILOBYTE UNIT PRICE: | 2 YEN |
| TOTAL SERVER UTILIZATION FEE: | 16,046 YEN |
| A102 — TOTAL NUMBER OF USERS: | 2 |
| USER MAINTENANCE-FEE UNIT PRICE: | 5,000 YEN |
| TOTAL USER MAINTENANCE FEE: | 10,000 YEN |
| A103 — TOTAL AMOUNT DUE: | 83,046 YEN |
| LOG OFF (A104) | OK (A105) | PRINT (A106) |

*Fig. 45*

| | |
|---|---|
| KAMEYAMA TOURIST INC.<br>PAYMENT DUE FOR FISCAL MONTH OF JANUARY | |
| BASIC MONTHLY FEE FOR SERVER UTILIZATION: 30,000 YEN | A100 |
| TOTAL COST OF MATERIALS CREATION: 45,000 YEN | A114 |
| ORDINARY DELIVERY; L PRINT (80 PRINTS / 20 ORDERS) 12,000 YEN<br>URGENT DELIVERY; L PRINT (20 PRINTS / 10 ORDERS) 6,000 YEN<br>ORDINARY DELIVERY; SLIDE (30 PRINTS / 20 ORDERS) 18,000 YEN<br>ORDINARY DELIVERY; SLIDE (10 PRINTS / 10 ORDERS) 9,000 YEN | A115 |
| DOWNLOAD STATEMENT | A116 |
| NUMBER OF SERVER KILOBYTES UTILIZED: 8,023 KB<br>KILOBYTE UNIT PRICE: 2 YEN<br>TOTAL SERVER UTILIZATION FEE: 16,046 YEN | A101 |
| TOTAL NUMBER OF USERS: 2<br>USER MAINTENANCE-FEE UNIT PRICE: 5,000 YEN<br>TOTAL USER MAINTENANCE FEE: 10,000 YEN | A102 |
| TOTAL AMOUNT DUE: 83,046 | A103 |
| LOG OFF (A104)  OK (A105)  PRINT (A106) | |

W24

IMAGE ORDERING SYSTEM AND METHOD

BACKGROUND OF THE INVENTION

1. Field of the Invention

This invention relates to an image ordering system that includes a center server, a first client computer for an orderer and a second client computer for a laboratory that are capable of communicating data with one another, a method of ordering images, the center server, a method of controlling the operation thereof, the client computers and methods of controlling the operation thereof.

2. Description of the Related Art

Film bearing the photographs for a catalog are kept by a developing laboratory (a photo lab). A user (orderer) who wishes to utilize these photographs for a catalog requests a photo store to print the photographs. The photo store contacts the laboratory and has the laboratory print the photographs. The printed photographs are delivered by mail from the laboratory to the photo store. The user goes to the photo store to pick up the printed photographs.

With a system of this kind, however, the user is inconvenienced. For example, the user cannot request the printing of a photograph if a photo store is not located in the vicinity, and the user must go to the photo store while the store is open.

DISCLOSURE OF THE INVENTION

Accordingly, an object of the present invention is to make it convenient for a user to order a photograph (film).

An image ordering system according to the present invention includes a center server, a first client computer for an orderer and a second client computer for a laboratory that are capable of communicating data with one another.

The first client computer has an input unit for inputting data that specifies an image to be printed, and a first transmitting unit for transmitting, to the center server, the image specifying data that is input from the input unit and data specifying the orderer.

The center server has a first receiving unit for receiving the image specifying data and the orderer specifying data transmitted from the first transmitting unit of the first client computer, and a second transmitting unit for transmitting the image specifying data and the orderer specifying data, which has been received by the first receiving unit, to the second client computer in association with each other.

The second client computer has a second receiving unit for receiving the image specifying data and the orderer specifying data transmitted from the second transmitting unit of the center server, and a first alerting unit for giving notice of information regarding an image specified by the image specifying data and of an orderer represented by the orderer specifying data, which items of data have been received by the second receiving unit.

The present invention provides also a method suited to the image ordering system described above. Specifically, the method is applied to an image ordering system that includes a center server, a first client computer for an orderer and a second client computer for a laboratory that are capable of communicating data with one another.

The first client computer inputs data specifying an image to be printed and transmits image specifying data, which has been input from the input unit, and orderer specifying data to the center server.

The center server receives the image specifying data and orderer specifying data transmitted from the first client computer and stores the received image specifying data and orderer specifying data in the second client computer in a form associated with each other.

The second client computer receives the image specifying data and orderer specifying data sent transmitted from the center server and gives notice of information regarding an image specified by the received image specifying data and an orderer represented by the received orderer specifying data.

The center server, the first client computer and the second client computer may be constructed as stand-alone devices. The present invention further provides a method of controlling the operation of the center server and a method of controlling the operation of the second client computer.

In accordance with the present invention, the first client computer is installed at company or in a private residence and the second client computer is installed at a laboratory. The first client computer, second client computer and center server are capable of communicating data with one another.

Data representing an image to be printed is entered at the first client computer. The entered image specifying data and data specifying an orderer (inclusive of the person who entered the image specifying data or a person regarded as being the one who essentially entered the image specifying data) is transmitted from the first client computer to the center server.

The image specifying data and orderer specifying data transmitted from the first client computer is received by the center server, whereupon the received image specifying data and orderer specifying data is transmitted to the second client computer in associated form.

The second client computer receives the image specifying data and the orderer specifying data transmitted from the center server. Notice is given of information (a code identifying the image, the image itself, etc.) regarding the image represented by the received image specifying data and of the orderer represented by the orderer specifying data. (For example, notice may be given by printing the name of the orderer or displaying the name of the orderer on a display unit).

The laboratory has a library of photographs and film, etc. By being informed of the information regarding the image of which notice has been given, the operator of the laboratory where the second client computer has been installed can ascertain which print order is for which image. Further, by being informed of the orderer, the operator of the laboratory can ascertain the orderer. The operator finds the photograph or film, etc., corresponding to the ordered image in the library and prints (duplicates) the photograph or film. A print obtained by printing is delivered to the orderer from the laboratory.

In accordance with the present invention, an order to print an image can be issued using the client computer in the possession of the orderer and therefore it is unnecessary for the orderer to go to the laboratory. In addition, the orderer can order the printing of an image regardless of the business hours of the laboratory. Furthermore, an order from a user to print an image can be managed at the center server. Accordingly, image specifying data and orderer specifying data can be transmitted to a laboratory having a film library that includes the ordered image.

There may be a plurality of second client computers. In such case the center server stores, in advance, correspondence data representing with which second client computer among the plurality thereof the client computer of the orderer is affiliated. On the basis of the correspondence data, the center server determines with which second client computer, among the plurality thereof, the orderer specified by the orderer data received by the first receiving unit is affiliated and transmits the image data and the orderer specifying data to the second client computer that has been determined.

The center server may further have an image database storing image data. In such case the first client computer would have a display controller for displaying, on a display unit, a thumbnail image of an image represented by image data that has been stored in the image database of the center server. For example, data representing a thumbnail image would be transmitted from the center server to the first client computer. Of course, the display controller may display an image itself, which is represented by image data that has been stored on the image database, rather than a thumbnail image.

While observing thumbnail images displayed on the display unit, the user can enter data specifying the image to be printed.

The center server has a calculation unit which, on the basis of image specifying data received by the first receiving unit, calculates an estimate of a printing fee for printing an image specified by the image specifying data, and a third transmitting unit for transmitting, to the first client computer, data representing the estimate calculated by the calculation unit.

In this case, the first client computer has a third receiving unit for receiving the estimate data transmitted from the third transmitting unit of the center server, and a second alerting unit for giving notice of the estimate represented by the estimate data received by the third receiving unit.

The user of the first client computer thus can ascertain the estimated fee for printing an image. Upon checking the estimate, the user can request formally that the image be printed.

The center server may have a calculation unit for calculating the printing fee for printing an image, and a fifth transmitting unit for transmitting data representing the fee calculated by this calculation unit to at least one of the first client computer and second client computer.

In this case, at least one of the first client computer and second client computer further includes a fifth receiving unit for receiving fee data transmitted from the fifth transmitting unit of the center server, and a second alerting unit for giving notice of the fee represented by the fee data received by the fifth receiving unit.

Thus, the orderer using the first client computer and the operator of the laboratory at which the second client computer has been installed can each ascertain the printing fee.

Even if the same number of copies is printed of the same image, the printing fee may be changed, or a fixed rate may be set, depending upon the orderer.

The first client computer and the second client computer may each be provided with a sixth receiving unit for receiving fee data transmitted from the fifth transmitting unit of the center server, and a third alerting unit for giving notice of a fee represented by the fee data received by the sixth receiving unit.

In this case it is preferred that the fifth transmitting unit of the center server transmit data representing the fee calculated by the fee calculation unit to the first client computer after it transmits this data to the second client computer.

Thus, utilization-fee data can be transmitted to the first client computer after the operator of the second client computer checks the fee data. In a case where the utilization fee is erroneous, the operator of the second client computer can report the error to the operator of the center server. Thus, it is possible to prevent an erroneous utilization fee from being reported to the orderer having the first client computer.

When there are a plurality of second client computers, an arrangement may be adopted in which the fifth transmitting unit transmits the fee data of the users affiliated with the second client computers.

When there are a plurality of laboratories, each laboratory may thus manage its own orderer. Thus, only a utilization fee of an orderer being managed by a particular laboratory can be reported to the corresponding laboratory.

Each of a plurality of agencies may be provided with an agency client computer. In this case the laboratory affiliated with the agency and the orderer affiliated with the laboratory would be defined. Furthermore, in this case the fifth transmitting unit would transmit utilization-fee data to a third client computer of the corresponding agency, the second client computer of the laboratory and the first client computer of the orderer.

It is preferred that the fifth transmitting unit of the center server transmit the fee data to the third client computer of the agency, the second client computer of the laboratory and the first client computer of the orderer in the order mentioned.

In this case, the third client computer of the agency further includes a first verification unit for verifying a fee represented by fee data transmitted from the fifth transmitting unit of the center server, and a sixth transmitting unit for transmitting verification data to the center server in response to verification performed by the verification unit.

The center server further includes a seventh receiving unit for receiving verification data transmitted from the third client computer of the agency. The fifth transmitting unit transmits the fee data to the second client computer of the laboratory in response to reception of the verification data by the seventh receiving unit.

Data representing a utilization fee is transmitted to a laboratory after it is verified by the agency. When a utilization fee is erroneous, therefore, the operator of the agency can notify the operator of the center server. This makes it possible to prevent an erroneous utilization fee from being communicated to the laboratory.

The fifth transmitting unit of the center server may transmit the fee data to the third client computer of the agency, the second client computer of the laboratory and the first client computer of the orderer in the order mentioned.

In this case, the client computer of the laboratory includes a second verification unit for verifying a fee represented by fee data transmitted from the fifth transmitting unit of the center server, and a seventh transmitting unit for transmitting verification data to the center server in response to verification performed by the second verification unit.

Further, the center server has an eighth receiving unit for receiving verification data transmitted from the second client computer of the laboratory. The fifth transmitting unit transmits the fee data to the first client computer of the orderer in response to reception of the verification data by the eighth receiving unit.

In this case also, any error in utilization fee can be reported from the operator of the laboratory to the operator of the center server, thereby making it possible to prevent an erroneous utilization fee from being reported to the orderer.

When the third client computer for an agency has been provided, this client computer includes a first setting unit for setting at least one of a laboratory affiliated with an agency and an orderer affiliated with a laboratory, and an eighth transmitting unit for transmitting attribute data, which has been set by the first setting unit, to the center server.

Thus, a laboratory managed by an agency and the orderer managed by the laboratory can be set by the operator of the agency.

The client computer for a laboratory may be provided with a second setting unit for setting an orderer affiliated with a laboratory, and a ninth transmitting unit for transmitting attribute data, which has been set by the second setting unit, to the center server.

Thus, the orderer managed by a laboratory can be set by the operator of the laboratory.

Further, at least one client computer of the third client computer for the agency and second client computer for the laboratory is further provided with a third setting unit for setting a service, from among a plurality of services, that can be utilized by the orderer, and a tenth transmitting unit for transmitting data, which represents the service that has been set by the third setting unit, to the center server.

Thus, services that can be utilized by orderers can be restricted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 illustrates a table of user names;

FIG. 6 illustrates a table of company-user linkage information;

FIG. 7 illustrates a table of company names;

FIG. 8 illustrates table of company master-slave information;

FIG. 9 illustrates a table for setting system services;

FIG. 10 illustrates a table for setting printing services;

FIG. 11 illustrates an order table;

FIG. 12 illustrates a product table;

FIG. 13 illustrates a table for specifying consignees;

FIGS. 15 to 21 illustrates examples of windows;

FIGS. 23 to 27 show examples of windows;

FIGS. 29 to 35 illustrates examples of windows;

FIG. 36 shows an example of an order form;

FIGS. 39 to 45 show examples of windows.

DESCRIPTION OF THE PREFERRED EMBODIMENT

A preferred embodiment of the present invention will now be described in detail with reference to the accompanying drawings.

Figure 1:
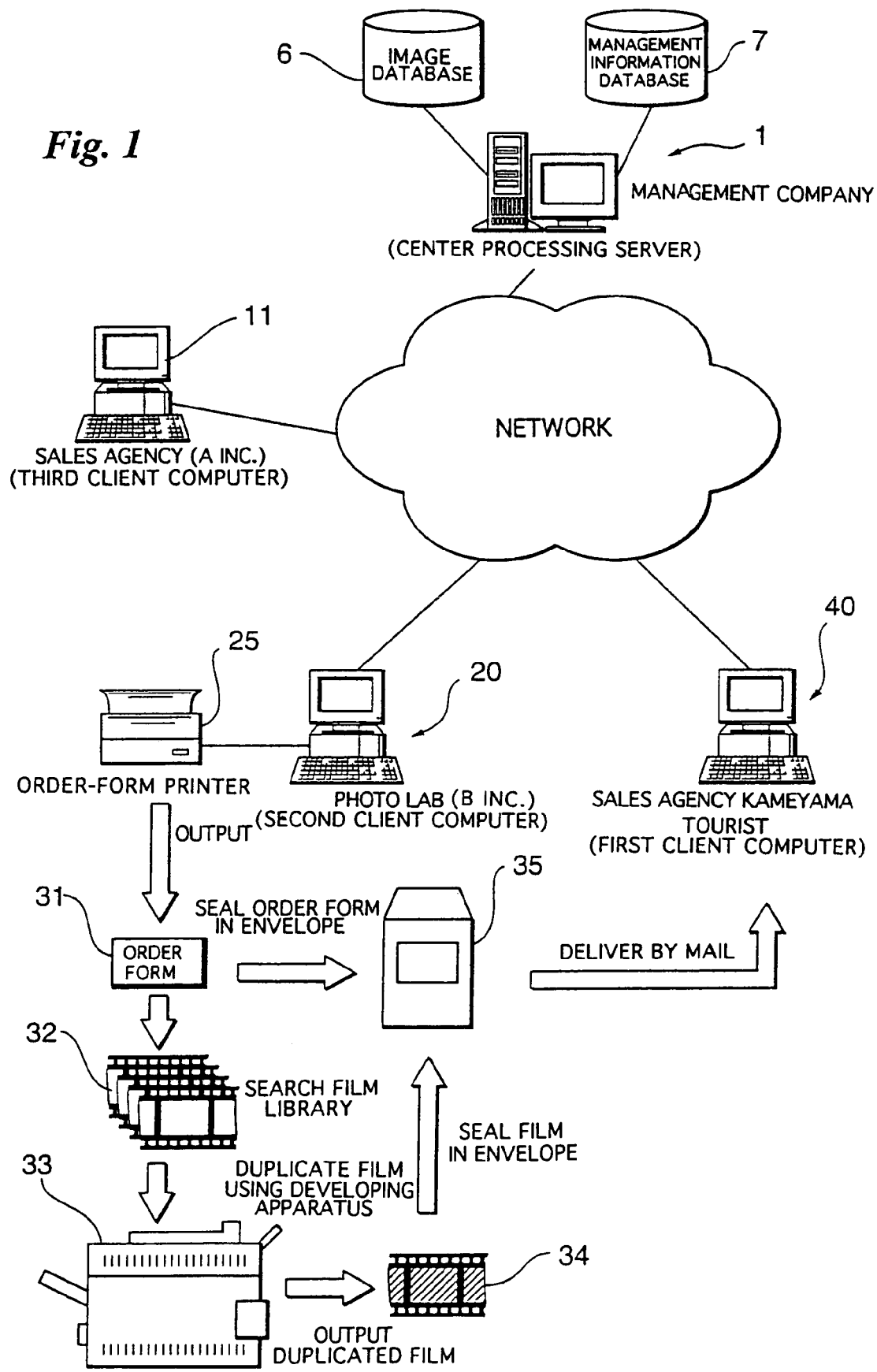
FIG. 1 illustrates the configuration of a film ordering system.

FIG. 1, which illustrates a preferred embodiment of the present invention, shows a film ordering system for ordering duplication of film.

The film ordering system includes a center processing server 1, a first client computer 40, a second client computer 20 and a third client computer 11. The center processing server 1 is installed at a management company. The third client computer 11 is installed at a sales agency, the second client computer 20 at a photo lab and the first client computer 40 at the residence or company (here assumed to be a travel agency) of an orderer (user).

As will be described later, an image database 6 and a management information database 7 have been connected to the center processing server 1 installed at the management company. An order-form printer 25 has been connected to the second client computer 20 installed at the photo lab. The photo lab has a large stock of film (referred to as a film library).

When duplication of a film contained in the film library of the photo lab is ordered by the travel agency, order data is transmitted to the center processing server 1 of the management company using the first client computer 40 installed at the travel agency. The center processing server 1 accepts the order data from the first client computer 40 of the travel agency. The accepted order data is transmitted from the center processing server 1 of the management company to the second client computer 20 of the photo lab.

Upon receiving the order data, the second client computer 20 outputs an order form 31, which is indicated by the order data, from the order-form printer 25. An employee of the photo lab determines the content of the order from the travel agency by looking at the order form printed out. In accordance with the order form, the film to be duplicated is found in a film library 32. The found film is duplicated using a developing apparatus, resulting in a duplicated film 34. The duplicated film 34 and the order form output from the order-form printer 25 are sealed in an envelope 35 and mailed to the travel agency 40.

In this embodiment, one or a plurality of sales agencies are affiliated with the management company (only one sales agency is shown in FIG. 1), one or a plurality of photo labs are affiliated with one or a plurality of sales agencies, and one or a plurality of users (travel agencies) are affiliated with one or a plurality of photo labs.

As will be described later, the third client computer 11 of the sales agency is capable of setting a photo lab affiliated with this sales agency and a service that can be used by the user. Further, the second client computer 20 of the photo lab is capable of setting a user service affiliated with this photo lab.

Figure 2:
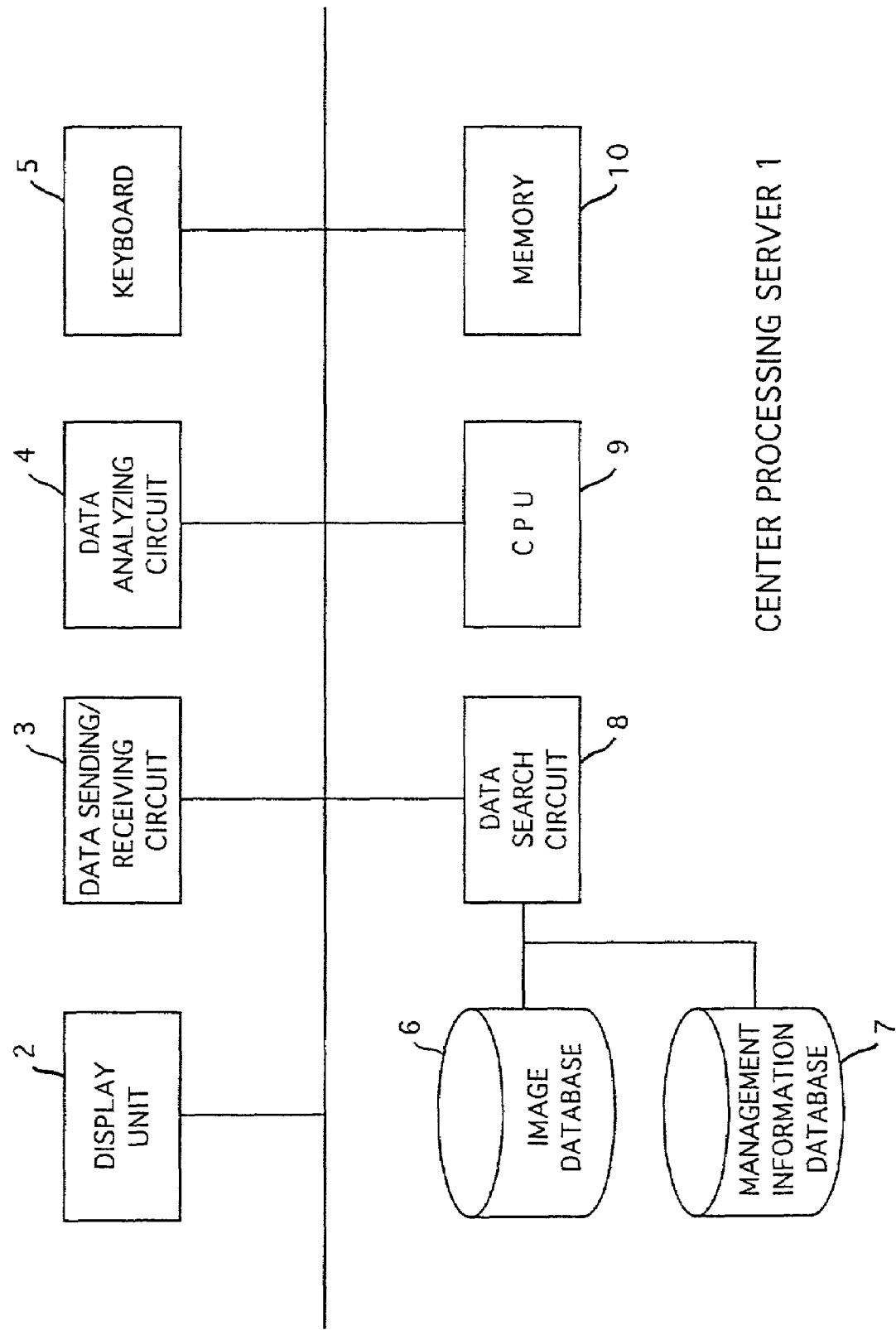
FIG. 2 is a block diagram illustrating the electrical construction of a center processing server.

FIG. 2 is a block diagram illustrating the electrical construction of the center processing server 1.

The overall operation of the center processing server 1 is controlled by a CPU 9.

The center processing server 1 includes a monitor display unit 2, a data sending/receiving circuit 3 for receiving data received via a network and transmitting data via the network, a data analyzing circuit 4 for analyzing data and a keyboard 5 for inputting data. The image database 6, which stores image data and thumbnail-image data representing images and thumbnail images thereof fixed optically on film located in the film library 32, and the management information database 7 have been connected to the center processing server 1, as mentioned above. The data that has been stored in the management information database 7 will be described later in detail.

The center processing server 1 includes a data search circuit 8 for searching data that has been stored in the image database 6 and in the management information database 7, and a memory 10 for storing data temporarily.

Figure 3:
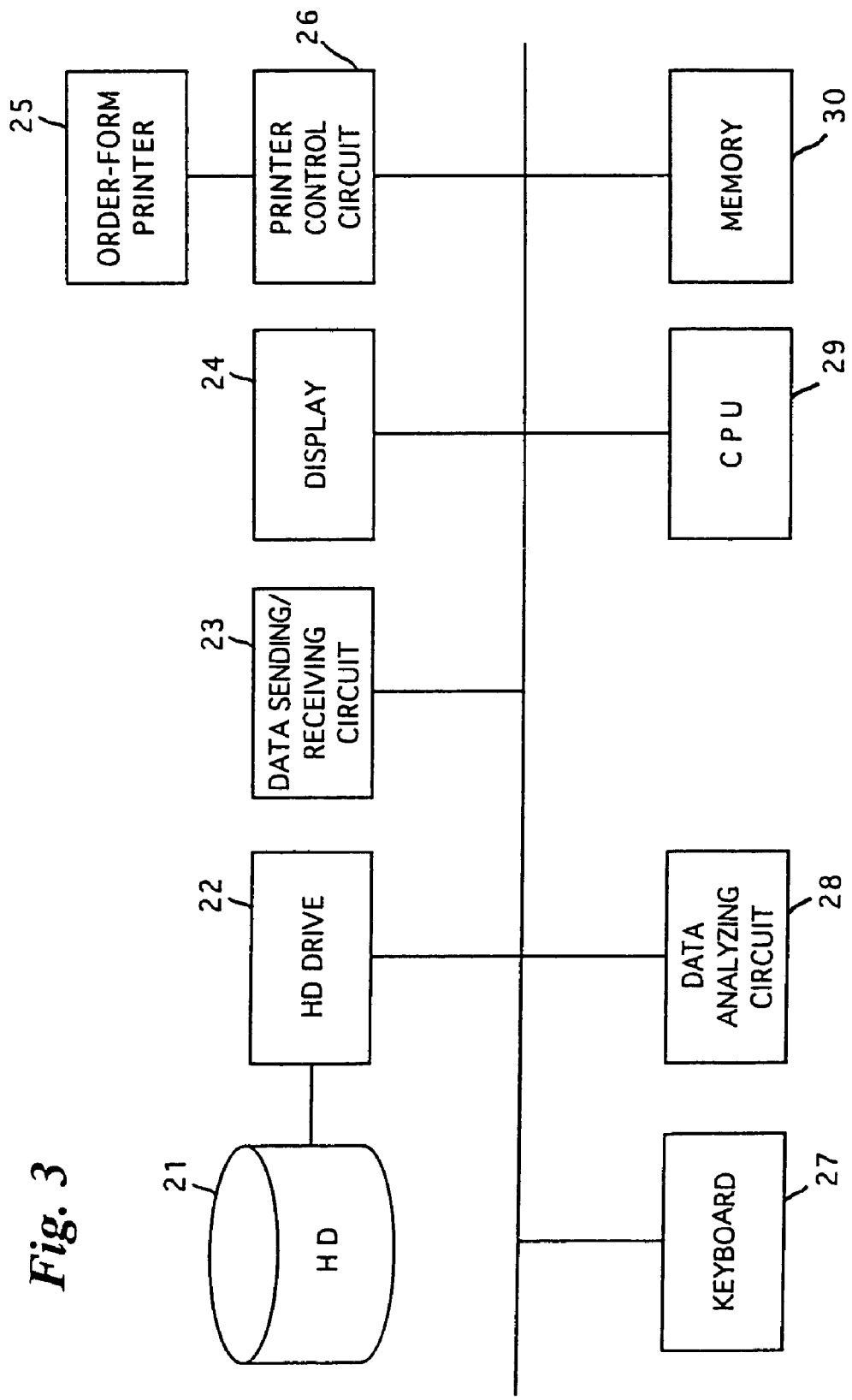
FIG. 3 is a block diagram illustrating the electrical construction of a client computer.
Figure 4:
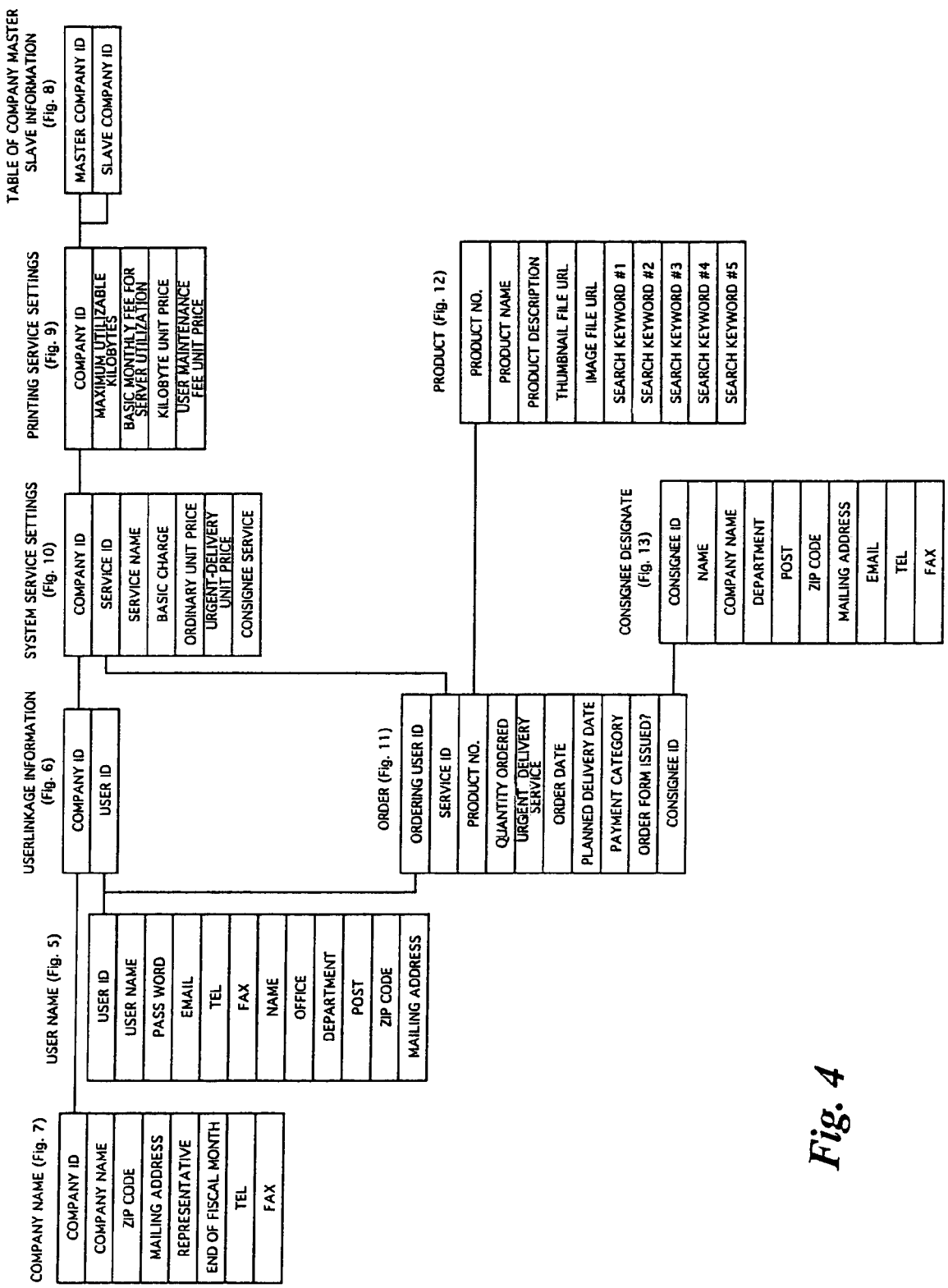
FIG. 4 is a diagram illustrating the structure of a management information database.

FIG. 3 is a block diagram illustrating the electrical construction of the second client computer 20 installed at a photo lab.

The overall operation of the second client computer 20 is controlled by a CPU 29.

The second client computer 20 includes a hard disk 21 for storing prescribed data, and an HD (hard disk) drive 22 for accessing the hard disk 21. The second client computer 20 further includes a data sending/receiving circuit 23 for receiving data received via a network and transmitting data via the network, and a monitor display unit 24 for displaying the content of an order. The second client computer 20 includes the order-form printer 25 and a printer control circuit 26 for controlling the order-form printer 25.

The second client computer 20 further includes a keyboard 27 for inputting data, a data analyzing circuit 28 for analyzing the content of data applied thereto, and a memory 30 for storing data temporarily.

The third client computer 11 installed at the sales agency and the first client computer 40 installed at the travel agency also have structures substantially the same as that of the second client computer 20. It goes without saying that the first client computer 40 and third client computer 11 also have the order-form printer 25 connected thereto.

Furthermore, it goes without saying that although each circuit in the center processing server 1 and second client computer 20 is expressed as being implemented by hardware, implementation by software is possible as well.

FIGS. 4 to 13 illustrate the content stored in the management information database 7 connected to the third client computer 11 as mentioned above.

The management information database 7 includes a table of user names (see FIG. 5), a table of company-user linkage information (see FIG. 6), a table of company names (see FIG. 7), a table of company master-slave information (see FIG. 8), a table for setting system services (see FIG. 9), a table for setting printing services (see FIG. 10), an order table (see FIG. 11), a product table (see FIG. 12) and a table for specifying consignees (see FIG. 13).

The table of company names, the table of company-user linkage information, the table for setting printing services, the table for setting system services and the table of company master-slave information are linked to one another by company ID, as will be described later. Further, the table of user names, the order table and the table of company-user linkage information are linked to one another by user ID, as will be described later. The order table and the table for setting printing services are linked to each other by service ID, as will be described later. The order table and the product table are linked to each other by product number, as will be described later. The order table and table for specifying consignees are linked to each other by a consignee service ID, as will be described later.

FIG. 5 illustrates the content of the table of user names.

The table of user names stores information regarding individual users.

Stored in the table of user names is data representing user IDs for identifying users, user names, passwords that allow users to access the center processing server 1, e-mail addresses, telephone numbers (TEL), facsimile numbers (FAX), names (same as the user names and may therefore be omitted), places of business of the companies with which the users are affiliated, departments, positions, zip codes and mailing addresses.

FIG. 6 illustrates the content of the table of company-user linkage information.

The table of company-user linkage information is a table for linking individual users and companies with which these individual users are affiliated. Here IDs for identifying the companies and the IDs of the individual users affiliated with these companies are associated with each other.

FIG. 7 illustrates the content of the table of company names.

The table of company names contains information concerning companies. The companies include all sales agencies, photo labs and travel agencies, the latter of which are users.

The table of company names includes company IDs, company names, zip codes of the company addresses, company addresses, end of fiscal month of each company, company telephone numbers (TEL) and company facsimile numbers (FAX).

FIG. 8 illustrates the content of the table of company master-slave information.

The table of company master-slave information illustrates the relationship between sales agencies and photo labs and the relationship between photo labs and travel agencies, such as photo labs affiliated with sales agencies and travel agencies affiliated with photo labs, as described earlier. A sales agency in a relationship with a photo lab is referred to as the master company with respect to the photo lab, and the photo lab in this relationship is referred to as the slave company of the sales agency. Similarly, a photo lab in a relationship with a travel agency is referred to as the master company of the travel agency, and the travel agency in this relationship is referred to as the slave company of the photo lab.

FIG. 9 illustrates the content of the table for setting system services.

The table for setting system services indicates the content set for each company in a case where the print ordering system is utilized.

The table for setting system services includes company IDs, maximum utilized kilobytes indicating the maximum quantity of data that can be utilized, basic charge for when the center processing server 1 is utilized, kilobyte unit price representing the unit price of data per kilobyte, and unit price of user maintenance fees.

FIG. 10 illustrates the content of the table for setting printing services.

The table for setting printing services indicates the content of printing services that users can utilize.

The table for setting printing services includes company IDs, service IDs for identifying the content of services, service names, basic charges, ordinary unit price, unit price for urgent delivery (the unit price for an urgent delivery is higher that the ordinary unit price), and whether or not there is a consignee service, which will be described later.

FIG. 11 illustrates the content of the order table.

The order table indicates the content of orders received from users.

The order table includes the IDs (ordering user IDs) of users who have placed orders, service IDs, product numbers (numbers specifying films), quantities ordered, whether or not urgent delivery service has been requested, order dates, planned delivery dates, payment category (monthly lump sum, cash on delivery, etc.), whether or not an order form has been sent to a photo lab, and consignee IDs (IDs indicating users who are who consignees).

FIG. 12 illustrates the content of the product table.

The product table indicates the content of films archived in the film library 32 of a photo lab.

The product table includes product numbers (which specify films), product names, product descriptions, thumbnail file URLs (Uniform Resource Locators) (URL names storing thumbnail-image data that has been stored in the image database 6), image file URLs (URL names storing image data that has been stored in the image database 6), and search keywords (search keywords #1-#5 are shown in FIG. 12) for finding the images of product numbers from the image database 6.

FIG. 13 illustrates the content of the table for specifying consignees.

The table for specifying consignees stores information regarding the consignees of films to be reproduced.

The table for specifying consignees includes IDs specifying consignees, consignee names, consignee company names, departments, posts, zip codes of consignee addresses, consignee addresses, e-mail addresses regarding the names of consignees, consignee telephone numbers (TEL) and consignee facsimile numbers (FAX).

Figure 14:
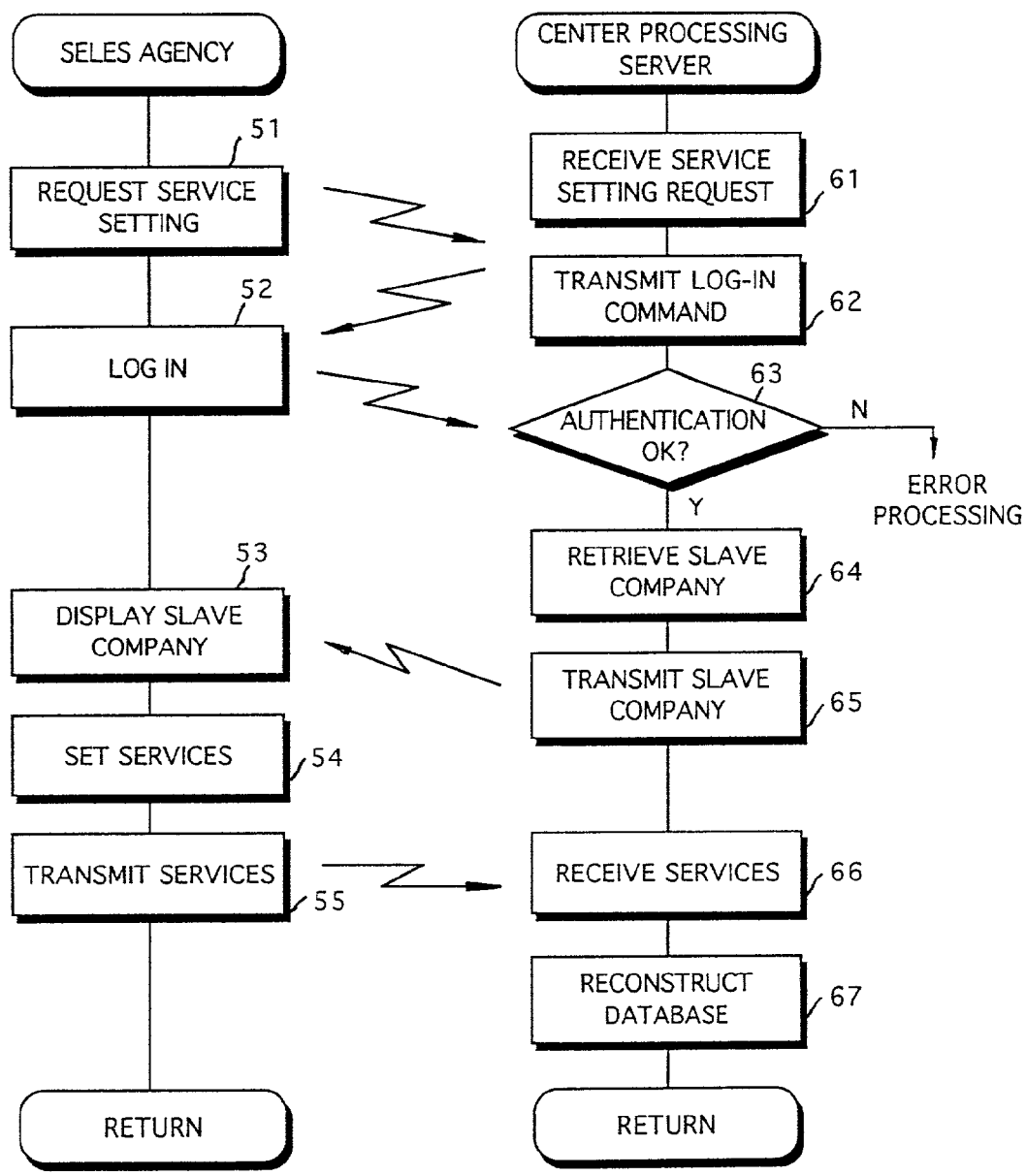
FIG. 14 is a flowchart illustrating processing for setting a service.
Figure 15:
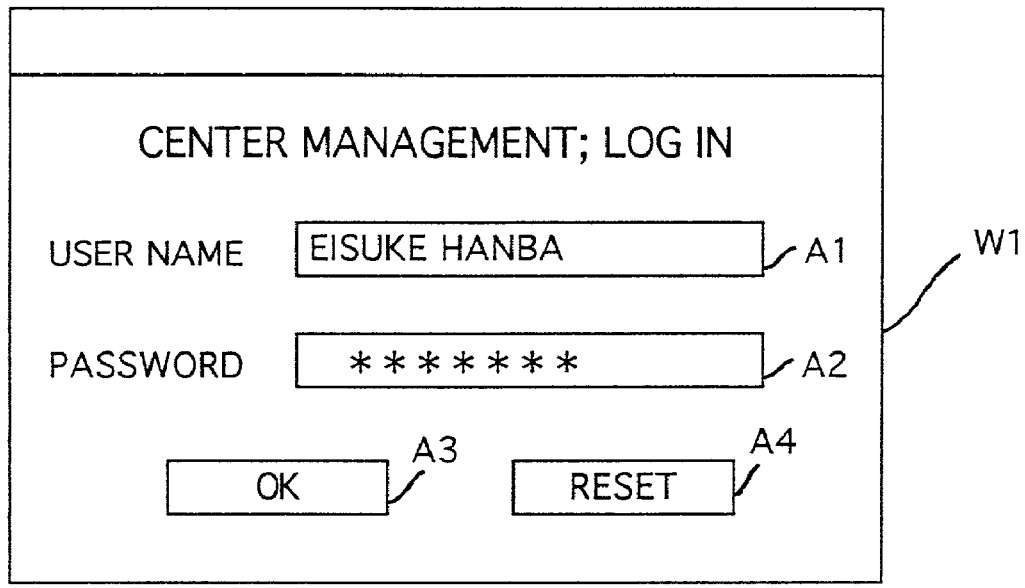
Figure 16:
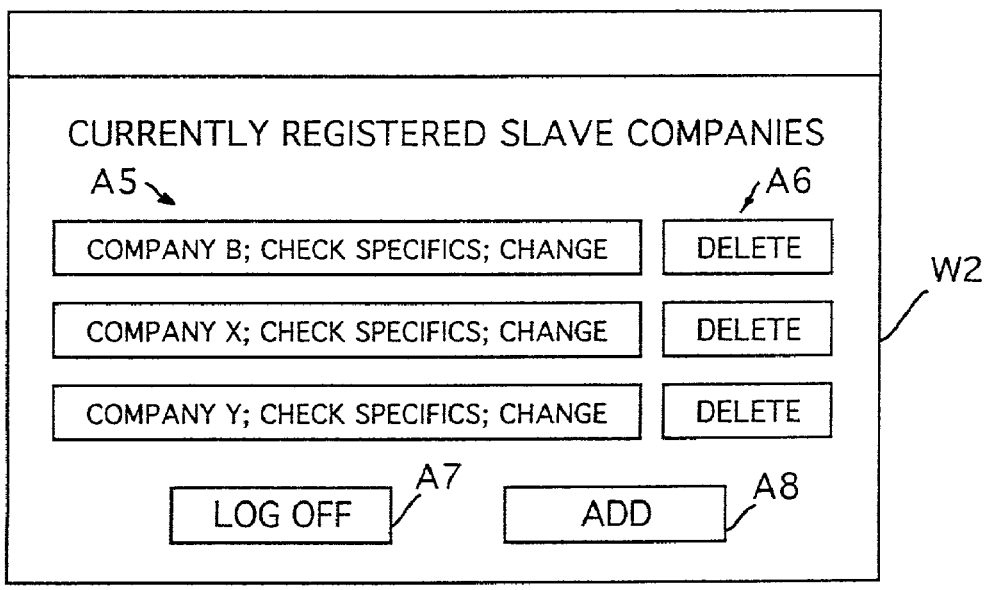
Figure 17:
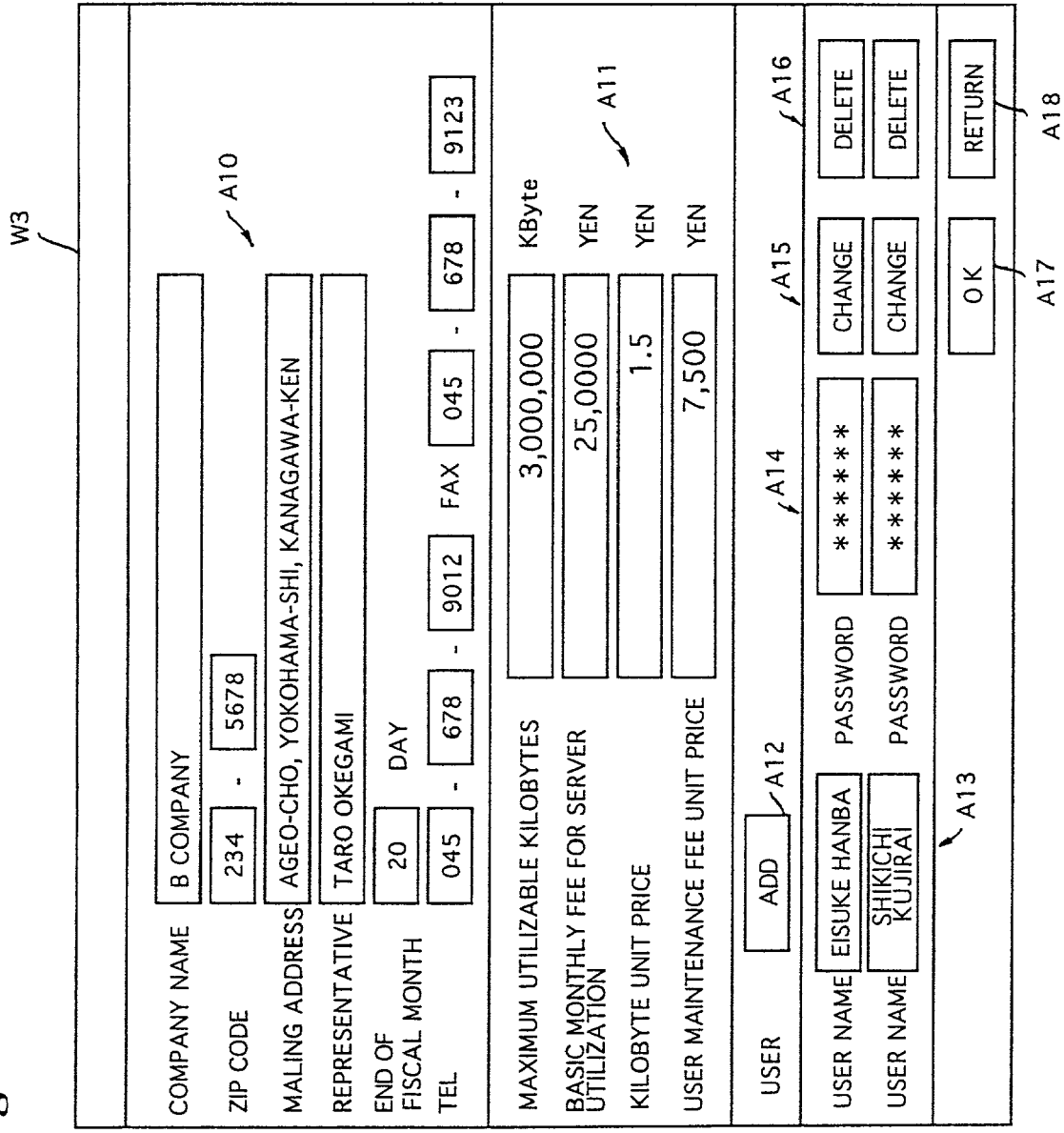
Figure 18:
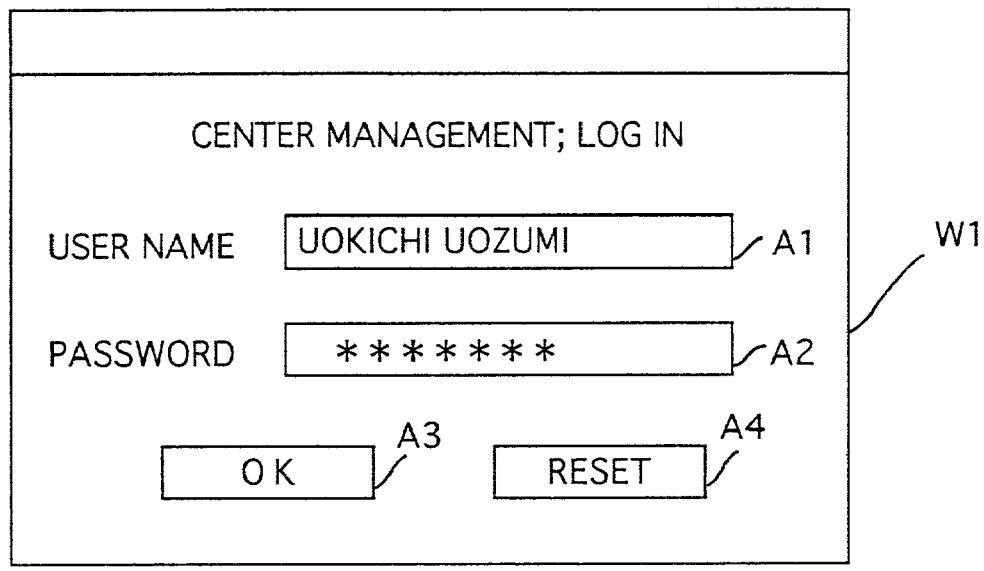

FIG. 14 is a flowchart illustrating processing for setting services (inclusive of setting of printing services and setting of system services). FIGS. 15 to 17 show examples of windows displayed on the display screen of the display unit of the third client computer 11 located at a sales agency.

The service to a company (slave company) affiliated with a sales agency can be set using the third client computer 11 installed at the sales agency.

First, the third client computer 11 installed at the sales agency accesses the center processing server 1 via the network. When the connection between the third client computer 11 and center processing server 1 is established, data indicative of the service setting request is transmitted from the third client computer 11 to the center processing server 1 (step 51).

Upon receiving data indicative of the service setting request, the center processing server 1 transmits log-in command data to the third client computer 11 that issued the service request (step 62).

When the log-in command data is received at the third client computer 11, a log-in window W1 of the kind shown in FIG. 15 is displayed on the display screen of the display unit of third client computer 11. The login-in window W1 includes the areas set forth below.

Data-name Display Area A1:

This is an area for displaying a user name that has been entered from the third client computer 11.

Password Area A2:

This is an area in which asterisks are displayed whenever a password corresponding to a user name is entered.

OK Area A3:

This is an area that is clicked by the user when an entered user name and password are correct.

Reset Area A4:

This is an area that is clicked by the user when an entered user name and password are to be reset.

If a user name (orderer name) and password are entered by an employee of the sales agency at which the third client computer 11 has been installed, data representing the entered user name and password is transmitted from the third client computer 11 to the center processing server 1 (log in) (step 52).

The data representing the entered user name and password transmitted from the third client computer 11 is received by the data sending/receiving circuit 3 at the center processing server 1. The user name and password are analyzed by the data analyzing circuit 4 based upon the data received. Reference is had to the table of user names, which is included in the management information database 7, to determine whether the user name and password obtained by the analysis match a user name and password that have been stored in the table of user names (authentication) (step 63).

By way of example, if the user name is "Eisuke Hanba", the password is "ei&han&345", as will be understood from the table of user names (see FIG. 5), and therefore it is determined whether the entered password matches.

If the result of authentication processing is that the user name and password are not correct ("NO" at step 63), then predetermined error processing is executed. If the user name and password are correct ("YES" at step 63, then the slave company of the sales agency at which the accessing third client computer 11 is located is retrieved in the management information database 7 (step 64).

By way of example, if the user name is "Eisuke Hanba", then it is known from the table of user names shown in FIG. 5 that the user ID of this user is "1". By referring to the table of company-user linkage information shown in FIG. 6, it is determined that the company ID corresponding to the user ID "1" is "1". Then, by referring to the table of company names shown FIG. 7, it is determined that the company name of company ID "1" is "A Inc.". Further, by referring to the table of company master-slave information shown in FIG. 8, it is determined that the company IDs of the slave companies are "3", "4" and "5" in a case where the company ID "1" is indicative of a master company (master company ID "1"). It is found by referring to the table of company names shown in FIG. 7 that the companies having the slave company IDs "3", "4" and "5" as their company IDs are "B Inc.", "X Inc." and "Z Inc.", respectively.

Data indicating the slave companies found as a result of the search are transmitted from the center processing server 1 to the third client computer 11 of the sales agency (A Inc.) (step 65).

The third client computer 11 receives the data representing the slave companies transmitted from the center processing server 1. A slave-company display window W2 is displayed on the display unit of the third client computer 11 (step 53).

FIG. 16 illustrates an example of the slave-company display window W2.

The slave-company display window W2 displays the slave companies of the sales agencies that have been registered with the center processing server 1. The slave-company display window W2 includes the areas set forth below:

Slave-company Display Area A5:

This is an area in which the slave companies found by the search conducted by the center processing server 1 are displayed one by one. Clicking on the area A5 causes display of a new window W3, which displays the specifics of service settings of the slave company designated by the area clicked.

Delete Area A6:

This area is provided so as to correspond to the slave-company display area A5. Clicking the delete area A6 causes the corresponding slave company to be deleted. More specifically, the corresponding slave company ID is erased from the table of company master-slave information contained in the management information database of center processing server 1.

Log-off Area A7:

This is an area clicked by the user of the third client computer 11 when user wishes to log off.

Add Area A8:

This is an area clicked by the user when the user wishes to add on a slave company.

A company for which a service is to be set is clicked in the slave-company display area A5. When this is done, the service window W3 corresponding to the clicked company is displayed on the display unit of the third client computer 11.

FIG. 17 illustrates an example of the service window W3. The service window W3 includes the areas set forth below.

Company-profile Display Area A10:

This area displays a profile (company name, zip code, address, representative, end of fiscal month, telephone number and facsimile number) of the selected company. The profile of a company name can be ascertained from the table of company names.

System-service Display Area A11:

This area displays the specifics of system services regarding a selected company. The set specifics of system services can be ascertained from the table for setting system services. For example, in case of the company B Inc., the company ID is "3". Accordingly, the content (maximum utilizable number of kilobytes and so on) for company ID "3" in the table for setting system services is displayed.

User Add Area A12:

This area is clicked when a user regarding a selected company is added on.

User-name Display Area A13:

This area displays the user names of users that have been registered in regard to the selected company. These user names can be determined from the table of company names, the company-user linkage information and the table of user names. If a company name is "B Inc. (Company B)", then the company ID is "3" and reference is had to the company-user linkage information table to determine that the user IDs corresponding to company ID "3" are "3" and "4". Reference is had to the table of user names to determine that the user ID "3" is indicative of the user name "Eisuke Hanba" and that the user ID "4" is indicative of the user name "Shiokichi Kujirai". These user names are displayed in area A13.

Password Display Area A14:

This area displays the passwords of registered users.

Change Display Area A15:

This area is clicked when already registered specifics (user name or password) of users are to be changed.

Delete Area A16:

This area is clicked when an already registered user is to be deleted.

OK Area A17:

This area is clicked if entered data is correct.

Return Area A18:

This area is clicked when the immediately preceding window W2 (see FIG. 16) is to be displayed.

When data is to be changed in regard to an already registered company, the area A5 corresponding to the company for which data is to be changed is clicked, as a result of which window W3 is displayed. The data is changed using window W3.

Further, in a case where a new company is to be registered as a slave company, the add area A8 in window W2 shown in FIG. 16 is clicked. In response, the window W3 shown in FIG. 17 is displayed but in a state in which no data has been entered. It goes without saying that since users have not been registered, the areas A12, A14, A15 and A16 are blank.

With reference again to FIG. 14, when setting of services (inclusive of additions and changes) is finished (step 54), data indicating the specifics of set services is transmitted from the third client computer 11 to the center processing server 1 (step 55).

The center processing server 1 receives the data indicative of service specifics transmitted from the third client computer 11 (step 66). When this occurs, each table in the management information database 7 is reconstructed in accordance with the received data indicative of services (step 67).

In the embodiment set forth above, a case is described in which the setting of services of a slave company of a sales agency is performed using the third client computer 11 located at the agency. However, services of a slave company of a photo lab can also be set using the second client computer 20 located at the photo lab that is a slave company of a sales agency.

FIGS. 18 to 21 illustrate examples of windows displayed on the display screen of the display unit 24 of second client computer 20. Windows corresponding to the windows shown in FIGS. 15 to 17 are designated by like reference characters, and areas that are the same as the areas included in the windows shown in FIGS. 15 to 17 are designated by like reference characters.

Figure 19:
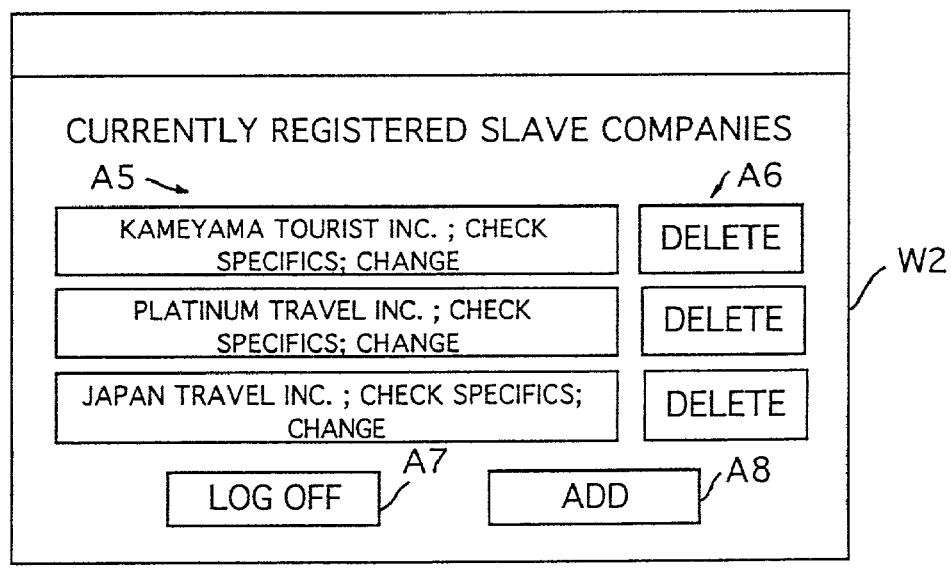

As described above, the second client computer 20 at the photo lab accesses the center processing server 1. When this occurs, the log-in window W1 shown in FIG. 15 is displayed on the display screen of the display unit 24 of second client computer 20. The user name and password are entered by the employee of the photo lab and data representing the user name and password is transmitted to the center processing server 1. When the center processing server 1 authenticates the inputs, the slave-company display window W2 shown in FIG. 19 is displayed on the display screen of the display unit 24.

If the employee of the photo lab is "Uokichi Uozumi", this employee determines that the company is "B Inc." by referring to the table of user names, the company-user linkage information table and the table of company names. By referring to the table of company master-slave information, it is found that the slave companies of "B Inc." are company IDs "6", "7" and "8, namely "Kameyama Tourist Inc.", "Platinum Travel Inc." and "Japan Travel Inc.", respectively. Accordingly, "Kameyama Tourist Inc.", "Platinum Travel Inc." and "Japan Travel Inc." are displayed in the slave-window area A5, as shown in FIG. 19.

If the "Kameyama Tourist" area is clicked, for example, then a service window W4 for Kameyama Tourist is displayed on the display unit 24 of the second client computer 20.

A printing service has been set in the table for setting printing services, as shown in FIG. 10, in regard to "Kameyama Tourist" having the company ID "6". As a consequence, unlike the service window W3 shown in FIG. 17, this window includes a set-service add area A10a, a printing-service setting area A20 and a consignee-service designation area A21.

The specifics of printing services that have been set are displayed in the printing-service setting area A20. This area includes a change area A19 corresponding to each service. When a set service is to be changed, the corresponding change area A19 is clicked. This is followed by clicking the basic charge, ordinary unit price or urgent-delivery unit price that is to be changed and then entering the changed fee from the keyboard. It goes without saying that data representing the changed service content is transmitted from the second client computer 20 to the center processing server 1 and that the table for setting printing services in the management information database 7 is reconstructed.

The consignee-service designation area A21 includes characters reading "YES" and "NO". When a consignee has been designated, "YES" is checked. When a consignee has not been designated, "NO" is checked. The consignee service item in the table for setting printing services changes in accordance with whether or not the consignee has been designated.

If the set-service add area A10a is clicked, a service-add window W5 shown in FIG. 21 is displayed on the display unit 24 of second client computer 20.

The service-add window W5 includes display areas conforming to the items of the table for setting printing services. The items included will now be described.

Service-name Display Area A22:

This is an area for displaying an entered service name.

Basic-charge Display Area A23:

This is an area for displaying a basic charge when a service is utilized. The entered charge is displayed.

Ordinary Unit-price Display Area A24:

This is an area for displaying an entered ordinary unit price.

Urgent-delivery Unit-price Display Area A25:

This is an area for displaying an entered urgent-delivery unit price. An urgent-delivery unit price is the unit price in a case where film is duplicated on an urgent basis.

Add Area A26:

This is an area clicked when an addition is to be made to the specifics of an entered service.

Cancel Area A27:

This is an area clicked when the specifics of entered service are to be cancelled.

Data indicating an added service or the like is transmitted from the second client computer 20 to the center processing server 1. The printing-service setting table that has been stored in the management information database 7 is reconstructed at the center processing server 1.

Thus, the settings of a service can be changed and a service can be added on regarding the slave company of a photo lab by using the second client computer 20 installed at the photo lab. Further, the settings of a service can be changed and a service can be added on regarding the slave company of a sales agency by using the third client computer 11 installed at the sales agency. The settings (fees, whether a service is utilizable or not) of a service can be changed in accordance with the slave company.

Figure 22:
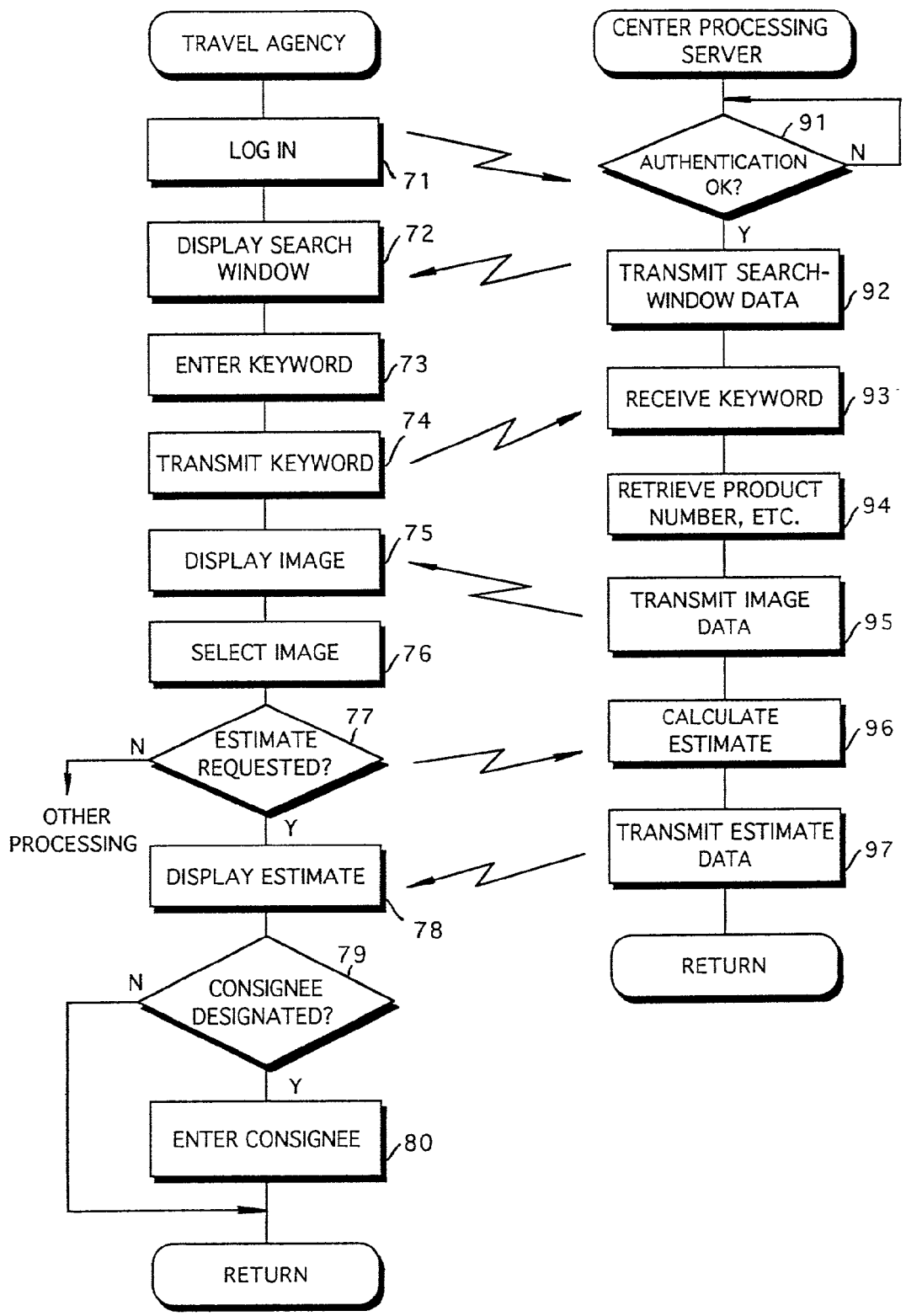
FIG. 22 is a flowchart illustrating processing of a film order.

FIG. 22 is a flowchart illustrating processing in a case where a film order is placed using the first client computer 40 installed at the travel agency. FIGS. 23 to 27 show examples of windows displayed on the display unit of the first client computer 40.

Figure 23:
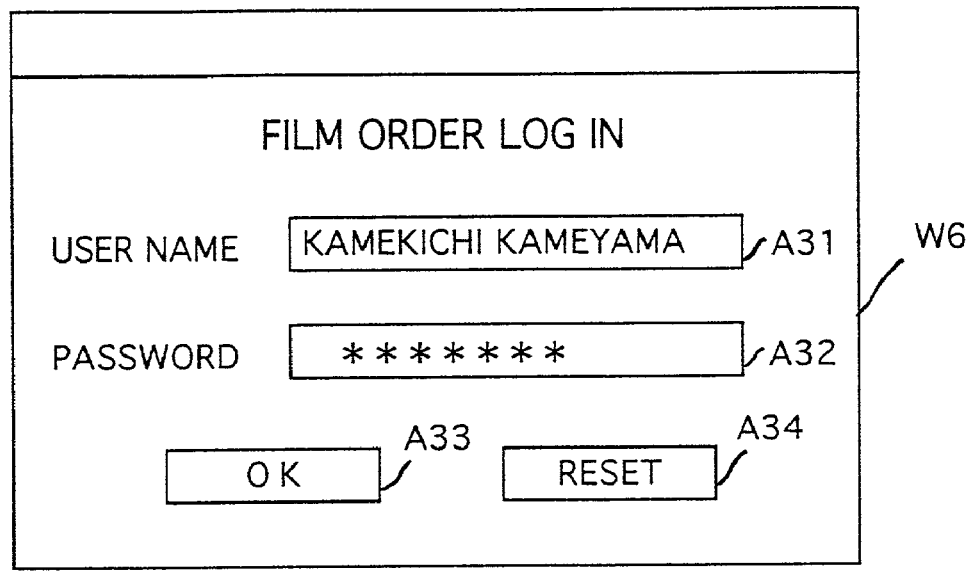

The first client computer 40 accesses the center processing server 1, whereupon a film order window W6 of the kind shown in FIG. 23 is displayed on the display unit of the first client computer 40.

The film order window W6 includes a user-name display window A31 for displaying an entered user name, a password area A32 in which asterisks are displayed in accordance with an entered password, an OK area A33 and a reset area A34.

If the OK area A33 is clicked, data representing an entered user name and password is transmitted from the first client computer 40 to the center processing server 1 (log in) (step 71). The center processing server 1 executes authentication processing based upon the user name and password transmitted from the first client computer 40 (step 91). If the user name and password are authenticated ("YES" at step 91), search-window data is transmitted from the center processing server 1 to the first client computer 40 (step 92).

Figure 24:
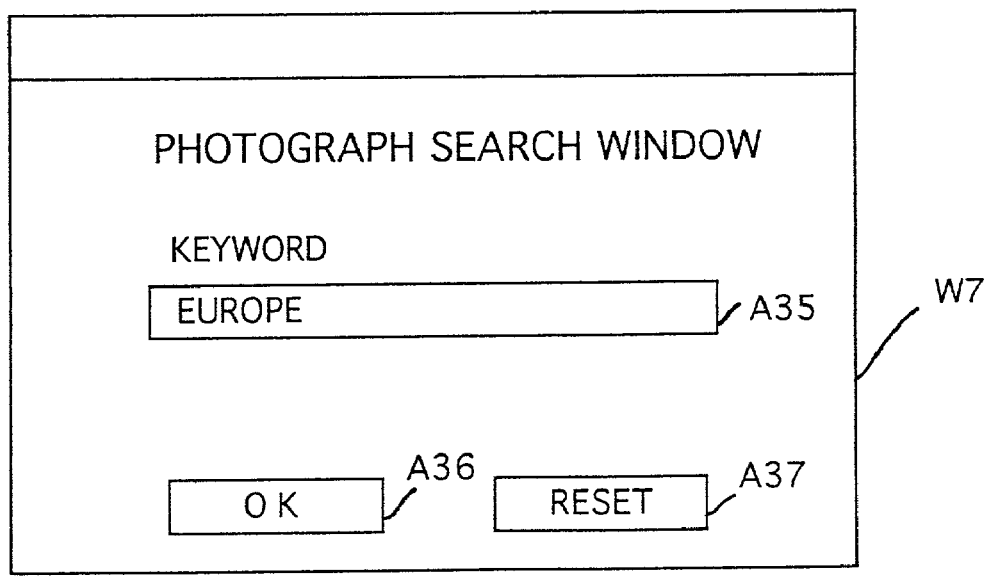

When the first client computer 40 receives the search-window data, a search window W7 of the kind shown in FIG. 24 is displayed on the display unit of the first client computer 40 (step 72). The search window W7 is for entering a keyword to retrieve an image for the purpose of requesting duplication of film. The search window W7 includes a keyword display area A35 in which an entered keyword is displayed, an OK area A36 and a reset area A37.

The user of the first client computer 40 enters a keyword corresponding to an image fixed optically on film desired to be duplicated (step 73). The entered keyword is displayed in the area A35. If the OK area A36 is clicked, data representing the entered keyword is transmitted from the first client computer 40 to the center processing server 1 (step 74).

The center processing server 1 receives the data representing the keyword (step 93). The received data representing the keyword is analyzed to obtain the keyword. A product number having a keyword identical with that of the obtained keyword and the URL thumbnail image file, etc., are found from the product table in the management information database (step 94). The found URL of the thumbnail image file is accessed and the thumbnail image data is read out of the image database 6. The read data representing the thumbnail image and product number, etc., is transmitted from the center processing server 1 to the first client computer 40 (step 95).

Figure 25:
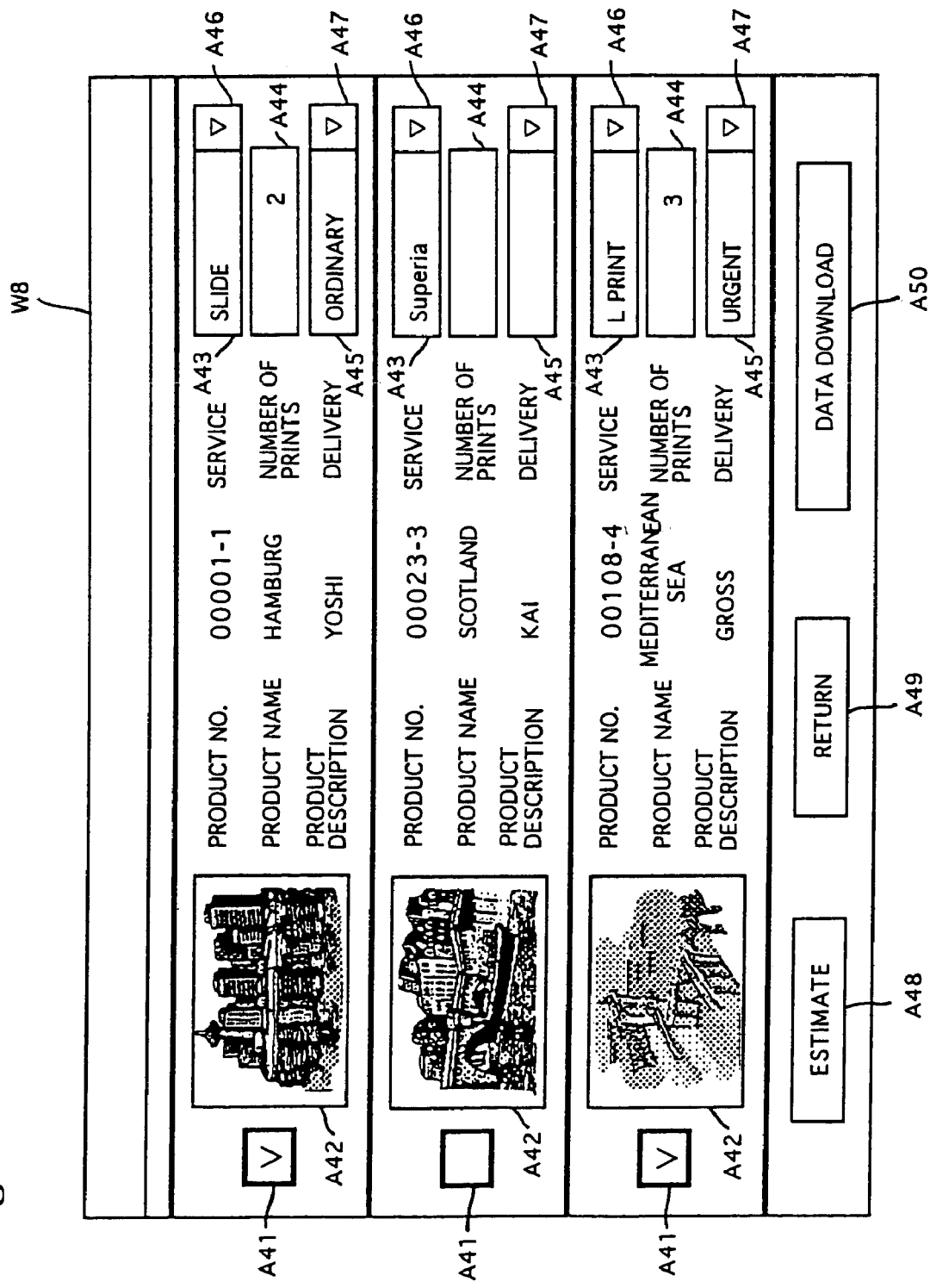

When the data representing the thumbnail image and product number, etc., is received at the first client computer 40, an image selection window W8 of the kind shown in FIG. 25 is displayed on the display unit of the first client computer 40 (step 75).

The image selection window W8 includes the areas set forth below.

Product-information Display Area A40:

This is an area for displaying product information representing product number, product name and product description obtained from the product table as a result of retrieval.

Check Area A41:

This is an area checked by the user when an image for ordering duplication of a film is designated.

Thumbnail-image Display Area A42:

This is an area in which a thumbnail image represented by thumbnail image data is displayed.

Service Display Area A43:

This is an area for displaying a service that has been selected.

Copy-number Display Area A44:

This area displays the number of duplicate copies to be made.

Delivery-date Display Area A45:

This area displays a selected delivery date.

Service Pull-down Area A46:

This area is pulled down in order to select a service. Pulling down the area A44 causes selectable services to be displayed. The user selects the desired service from the displayed services.

Delivery-date Pull-down Area A47:

This is an area pulled down in order to select a delivery date. The user selects the desired delivery data from the delivery dates displayed.

Estimate Area A48:

This is an area clicked by the user when an estimate for an order is issued.

Return Area A49:

This area is clicked by the user to return to the immediately preceding window W7.

Data Download Area A50:

This area is clicked by the user when image data representing a selected image is downloaded from the center processing server 1.

Clicking the check box A41 causes an image to be selected from the images being displayed in the window W8 (step 76). If an estimate is necessary, the estimate area A48 is clicked ("YES" at step 77). Data specifying a selected image, data indicating a selected service, data indicating the number of copies, data indicating a delivery date and data indicative of an estimate command is transmitted from the first client computer 40 to the center processing server 1.

The center processing server 1 receives data such as the data specifying a selected image and calculates the estimated charge by referring to the table for setting printing services (step 96). Data representing the estimated charge calculated is transmitted from the center processing server 1 to the first client computer 40 (step 97).

Figure 26:
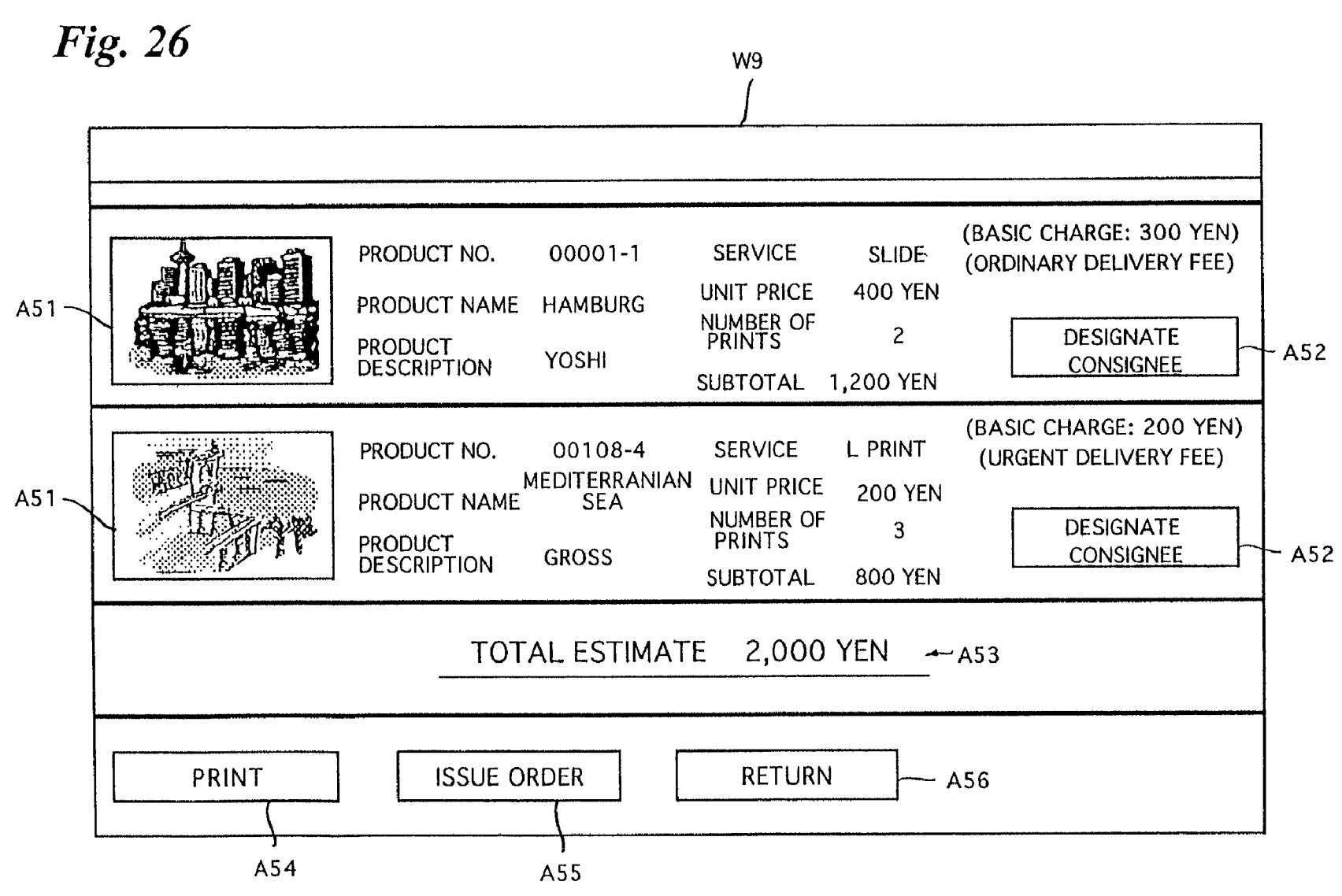

If estimate data is received at the first client computer 40, an estimate window W9 of the kind shown in FIG. 26 is displayed on the display unit (step 78). The estimate window W9 includes the following areas in addition to the product-information display area A40:

Thumbnail-image Display Area A51:
This area is for displaying the thumbnail image of a selected image.

Consignee Designation Area A52:
This is an area clicked by the user when a consignee is designated. Clicking this area causes the display of a window W10, described later.

Estimate-amount Display Area A53:
This area displays the amount of an estimate.

Print Area A54:
This area is clicked when the content of window W9 is to be printed.

Order Area A55:
This area is clicked when an order is to be issued.

Return Area A56:
This area is clicked to return to the immediately preceding window.

If the consignee designation area A52 is clicked ("YES" at step 79), a consignee input window W10 of the kind shown in FIG. 27 is displayed on the display unit of the first client computer 40. The consignee input window W10 includes the following areas:

Consignee-company Information Display Area A57:
This area displays the name, company name, department and post to which duplicated film is to be delivered. These items of information are displayed in the area A57 as they are entered.

Consignee-address Information Display Area A58:
This area displays the mailing address, telephone number, facsimile number and e-mail address of the consignee. These items of information are displayed in the area A58 as they are entered.

Payment-method Display Area A59:
This area displays method of payment. A plurality of payment methods are displayed by pull-down and a payment method is selected from these methods.

OK Area A60a:
This area is clicked if the entered information is correct.

Cancel Area A60:
This area is clicked when entered information is to be cancelled.

Figure 28:
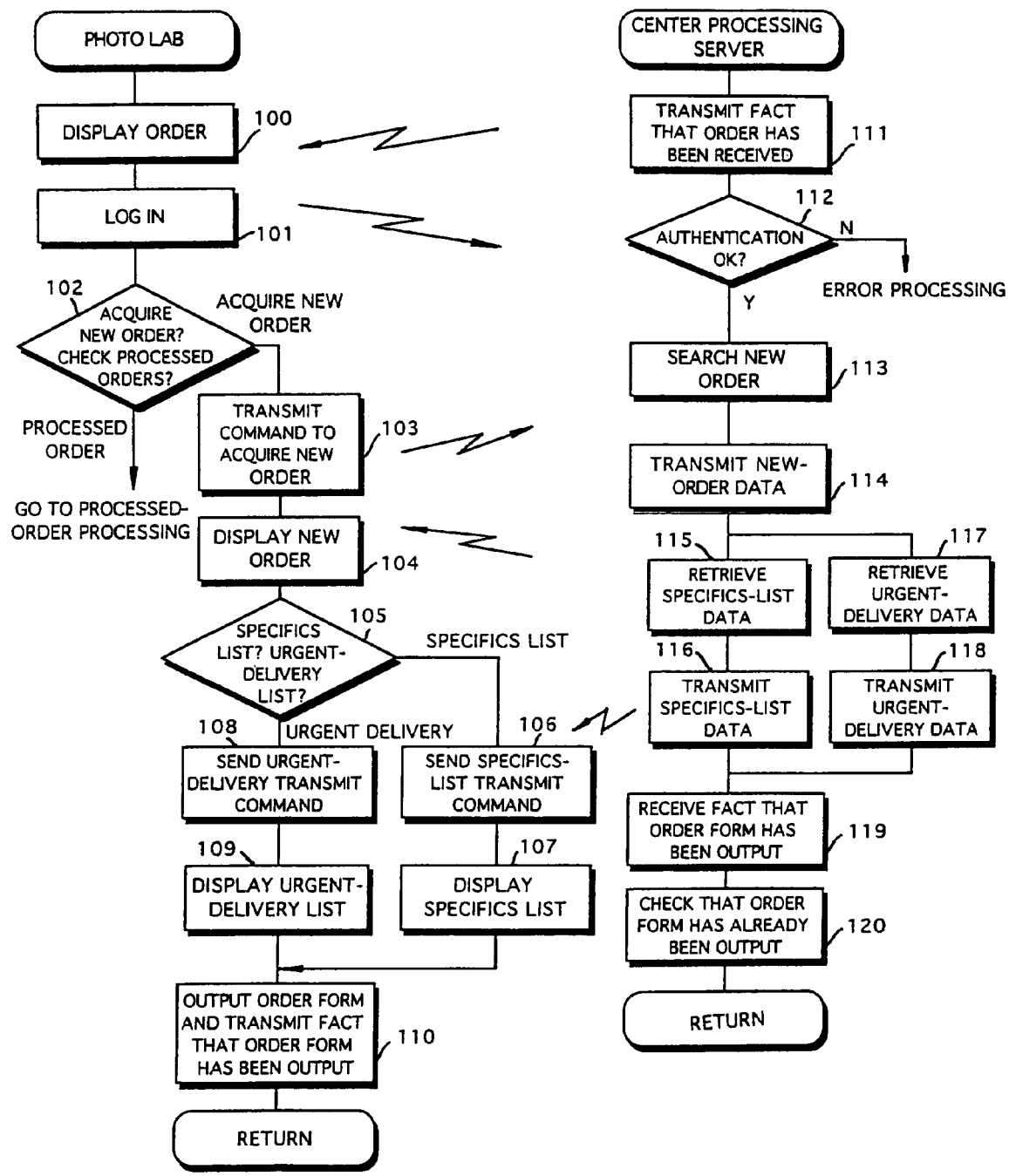
FIG. 28 is a flowchart illustrating processing for outputting an order form.

FIG. 28 is a flowchart illustrating processing for outputting an order form from the second client computer 20 installed at a photo lab. FIGS. 29 to 35 show examples of windows displayed on the display unit of the second client computer 20.

When there is an order for duplication of film, the center processing server 1 transmits data indicative of receipt of an order to the second client computer 20 of the photo lab, which is the master company of the user who placed the order (step 111). It goes without saying that the second client computer 20 and center processing server 1 have been connected.

The second client computer 20 receives the order data transmitted from the center processing server 1. When this occurs, a window indicating that an order has been made is displayed on the display screen of the display unit of second client computer 20 (step 100). An employee of the photo lab enters a user name and password to log in (step 101).

When authentication is made by the center processing server 1 ("YES" at step 112), data indicating that the user name and password have been authenticated is transmitted to the second client computer 20.

Figure 29:
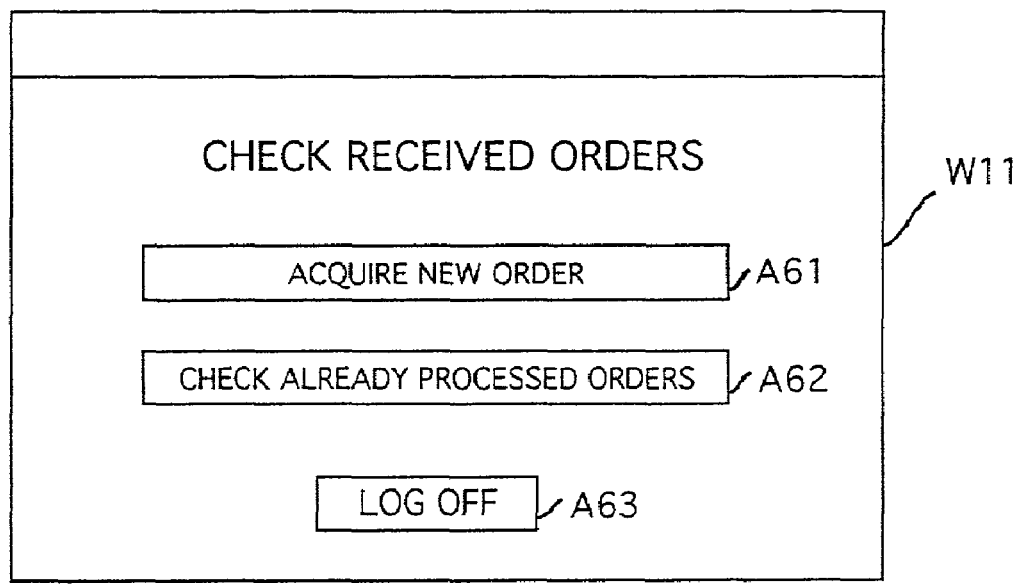

When the second client computer 20 is authenticated, an order confirmation window W1 of the kind shown in FIG. 29 is displayed on the display unit of the second client computer 20. The order confirmation window W1 includes an area A61 clicked when a new order is to be acquired, an area A62 clicked when an already processed order is to be checked, and a log-off area A63. Acquisition of a new order or acquisition of a processed order is selected by the order confirmation window W1 (step 102).

If acquisition of a new order is selected, data indicative of this fact is transmitted from the second client computer 20 to the center processing server 1 (step 103).

If data indicating acquisition of a new order transmitted from the second client computer 20 is received at the center processing server 1, a new order of the slave company of this photo lab is searched for in the order table (step 113). If the item "ORDER FORM ALREADY ISSUED" in the order table is "NO", then the order is regarded as being a new order. New-order data found by the search is transmitted from the center processing server 1 to the second client computer 20 (step 114).

If new-order data is received at the second client computer 20, a new-order window W12 of the kind shown in FIG. 30 is displayed on the display unit 24 of the second client computer 20 (step 104). The new-order window W12 displays the company names of orderers (Kameyama Tourist Inc., Platinum Travel Inc. and Japan Travel Inc.), numbers of orders received and delivery dates, as well as specifics-list areas A64 and an urgent-delivery list area A65. Clicking the area A64 or A65 causes the specifics list or the urgent-delivery list to be displayed.

If the specifics-list area A64 is clicked, specifics-list transmit command data is transmitted from the second client computer 20 to the center processing server 1 (step 106).

If the specifics-list transmit command data is received by the center processing server 1, the order table and product table are searched and data necessary for displaying the specifics list is retrieved (step 115). The retrieved specifics-list data is transmitted from the center processing server 1 to the second client computer 20 (step 116). As a result, an order form (e.g., Kameyama Tourist Inc.) and a product number, etc., are transmitted in linked form from the center processing server 1 to the second client computer 20.

Upon receiving the specifics-list data transmitted from the center processing server 1, the second client computer 20 causes a specifics-list window W13 of the kind shown in FIG. 31 to be displayed on the display unit 24 of the second client computer 20 (step 107).

Ordered images and their product numbers, product names, product descriptions, service specifics, unit prices and numbers of copies are displayed in the specifics-list window W13 classified by urgent order and ordinary order. The portion of the window displaying specifics regarding an urgent order is dimmed (indicated by the hatching in FIG. 31) so that the specifics of an urgent order and the specifics of an ordinary order can be distinguished from each other at a glance. The specifics-list window W13 includes also an order-form output area A67. Clicking the order-form output area A67 causes an order form to be output by the order-form printer 25 (step 110).

If the urgent-delivery list area A65 in window W12 is clicked, urgent-delivery transmit command data is transmitted from the second client computer 20 to the center processing server 1 (step 108).

The center processing server 1 receives the urgent-delivery transmit command data transmitted from the second client computer 20. When this occurs, reference is had to the order table to search for urgent-delivery data (step 117). The urgent-delivery data retrieved is transmitted from the center processing server 1 to the second client computer 20 (step 118).

When the urgent-delivery data transmitted from the center processing server 1 is received at the second client computer 20, an urgent-delivery list window W14 of the kind shown in FIG. 32 is displayed on the display screen of the display unit 24 of second client computer 20 (step 109).

The urgent-delivery list window W14 displays product information regarding an order for which urgent delivery has been specified among new orders. The urgent-delivery list window W14 also has an area A68 for displaying a thumbnail image of an ordered image, and the order-form output area A67.

If the order-form output area A67 is clicked, an order form is output from the order-form printer 25. If the order form is output, data indicating that the order form has been output is transmitted from the second client computer 20 to the center processing server 1 (step 110).

If the center processing server 1 receives the data indicative of completion of form output transmitted from the second client computer 20 (step 119), the item "ORDER FORM ALREADY ISSUED" in the order table becomes "YES" (step 120).

If the area A62 for checking processed orders is clicked in the order confirmation window W11 shown in FIG. 29, a processed-order confirmation window W15 shown in FIG. 33 is displayed on the display screen of the display unit 24 of second client computer 20.

The processed-order confirmation window W15 includes an area A68 for entering search conditions in order to display the specifics of an order for which an order form has been output (such an order is referred to as a "processed order"). The search conditions include a list of monthly orders, the date the order was received, delivery date, company name, requester, consignee, service, urgent delivery service, product number, product name and product description. The processed-order confirmation window W15 further includes a search area A69 and a return area A70.

If the search area A69 is clicked, a search window W16 of the kind shown in FIG. 34 is displayed on the display screen of the display unit 24 of second client computer 20. If the return area A70 is clicked, the window W11 displayed previously is displayed.

The search window W16 shown in FIG. 34 displays ordered images in areas A71 and also displays the times and dates on which order forms were output and the product information. The search window W16 further includes a search-condition confirmation area A72 and an area A73 for outputting an order form again. If the search-condition confirmation area A72 is clicked, a search-condition confirmation window W17 of the kind shown in FIG. 35 is displayed on the display unit 24. If the area A73 is clicked, an order form is output again by the order-form printer 25.

The search-condition confirmation window W17 shown in FIG. 35 includes an area A74 for displaying search conditions that were used in the retrieval of a processed order. The user can check the search conditions by observing the specifics displayed in area A74.

The search-condition confirmation window W17 further includes a search window area A75 which, by being clicked, effects a return to the search window area illustrated in FIG. 33.

FIG. 36 illustrates an example of the order form 31 output from the order-form printer 25.

The Order Form Includes the Following Areas:

Print-date-and-time Display Area A80:

This area displays the date and time at which the order form 31 was printed. The date includes the day of the week.

Order-date-and-time Display Area A81:

This area displays the date and time an order was issued. The date includes the day of the week.

Requester Display Area A82:

This area displays information regarding a requester (orderer). The company name of the requester, the requester's department, name, mailing address, telephone number, facsimile number and e-mail address are displayed.

Delivery-date Display Area A83:

This area displays the delivery date. Whether the delivery is urgent or ordinary also is displayed.

Consignee Display Area A84:

When a consignee has been specified, this area displays the consignee's company name, department, name, mailing address, telephone number, facsimile number and e-mail address.

Service Display Area A85:

This area displays service specifics. For example, basic charge, unit price and quantity are displayed. Payment category is displayed as well.

Product-specifics Display Area A86:

This area displays an ordered image and product information comprising product number, product name and product description.

The photo lab finds film from the film library 32 in accordance with the order form 31 thus output in the manner described above. The film that has been found is duplicated by the developing apparatus and is then delivered to the orderer or consignee.

Figure 37:
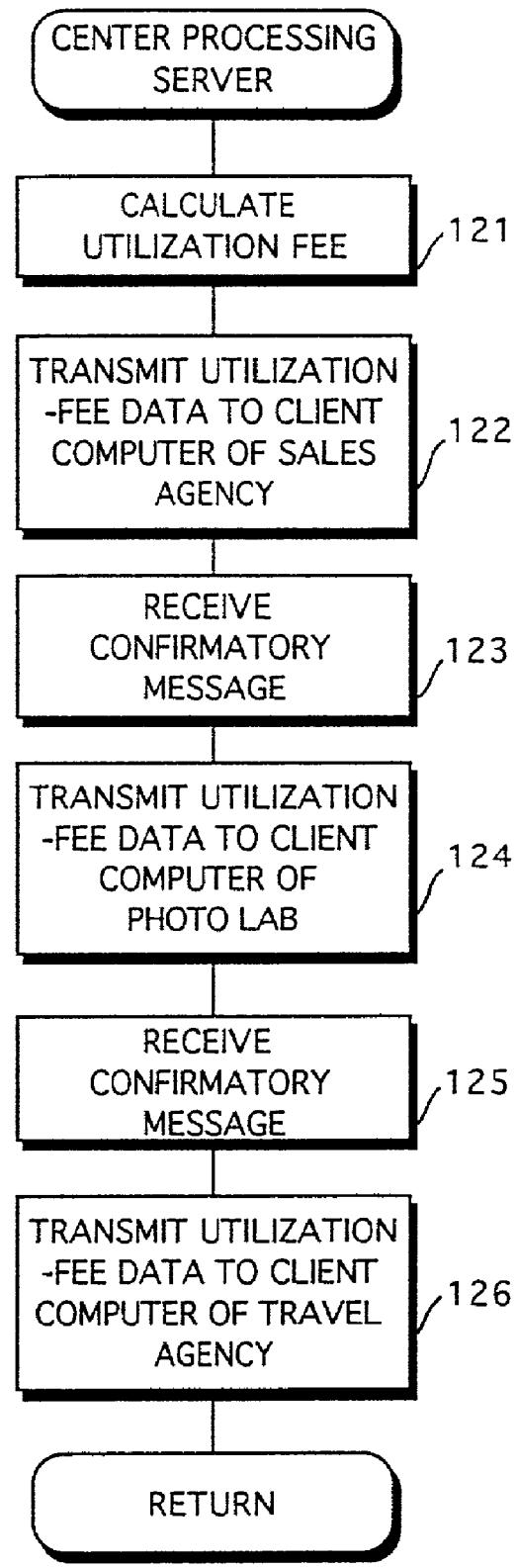
FIGS. 37 and 38 are flowcharts illustrating processing for settling accounts.
Figure 38:
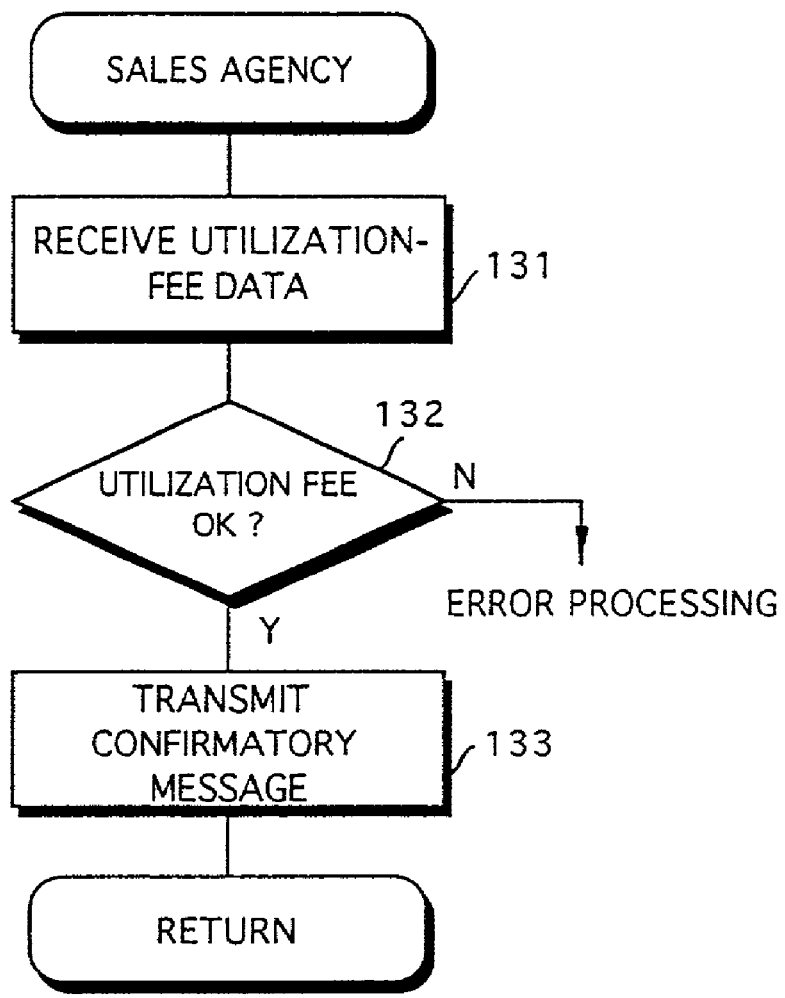
Figure 39:
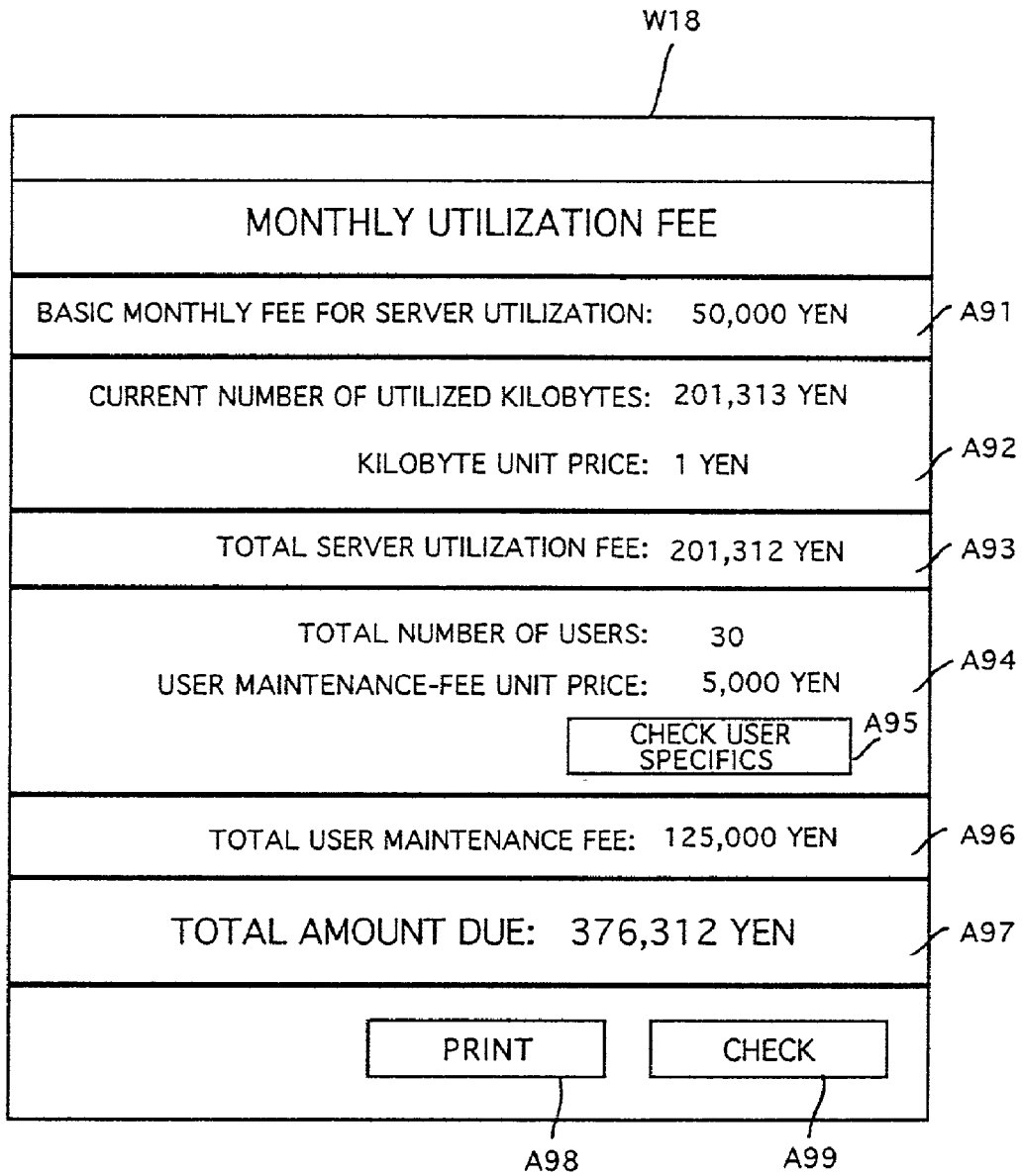
Figure 40:
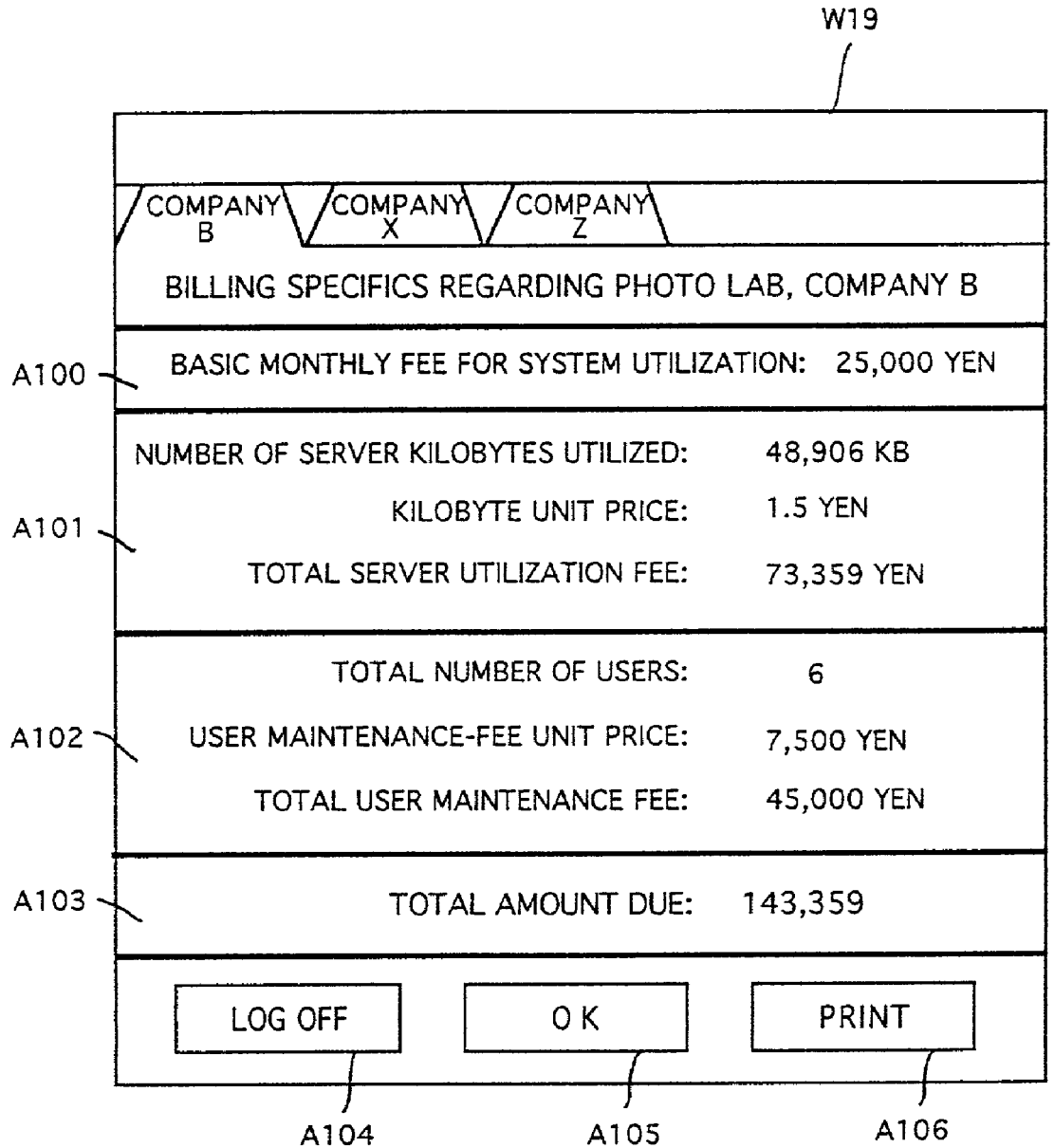
Figure 41:
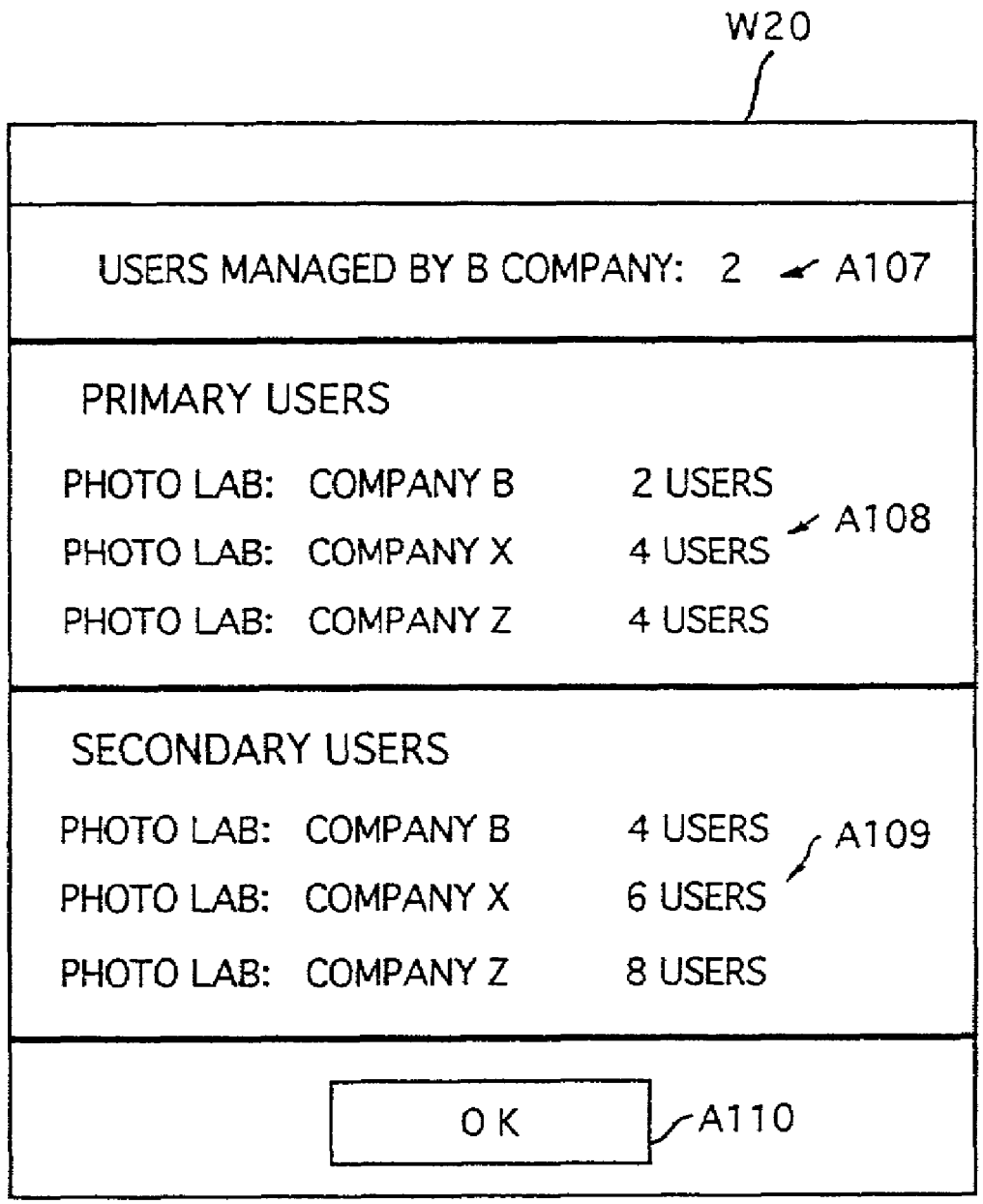
Figure 42:
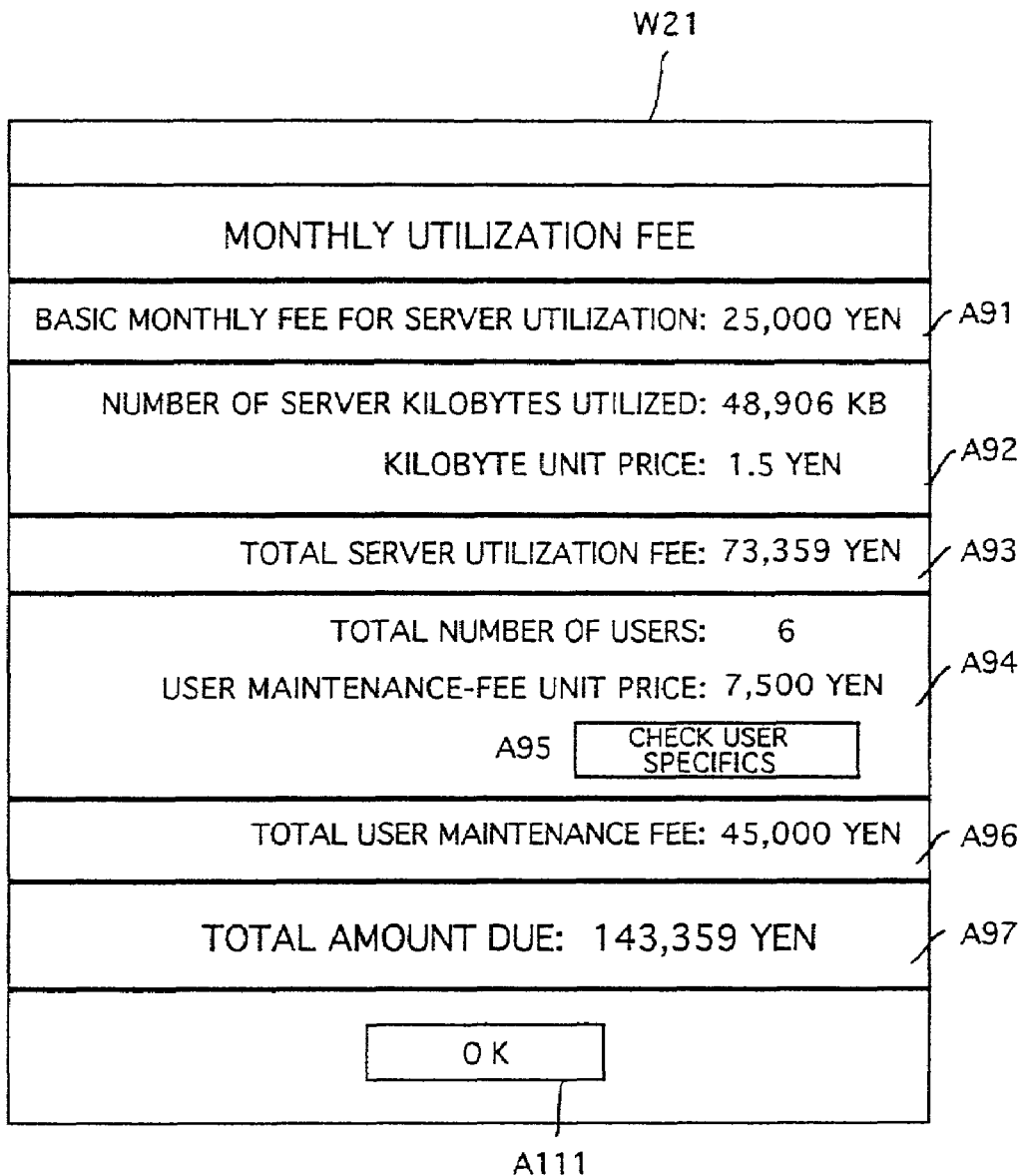
Figure 44:
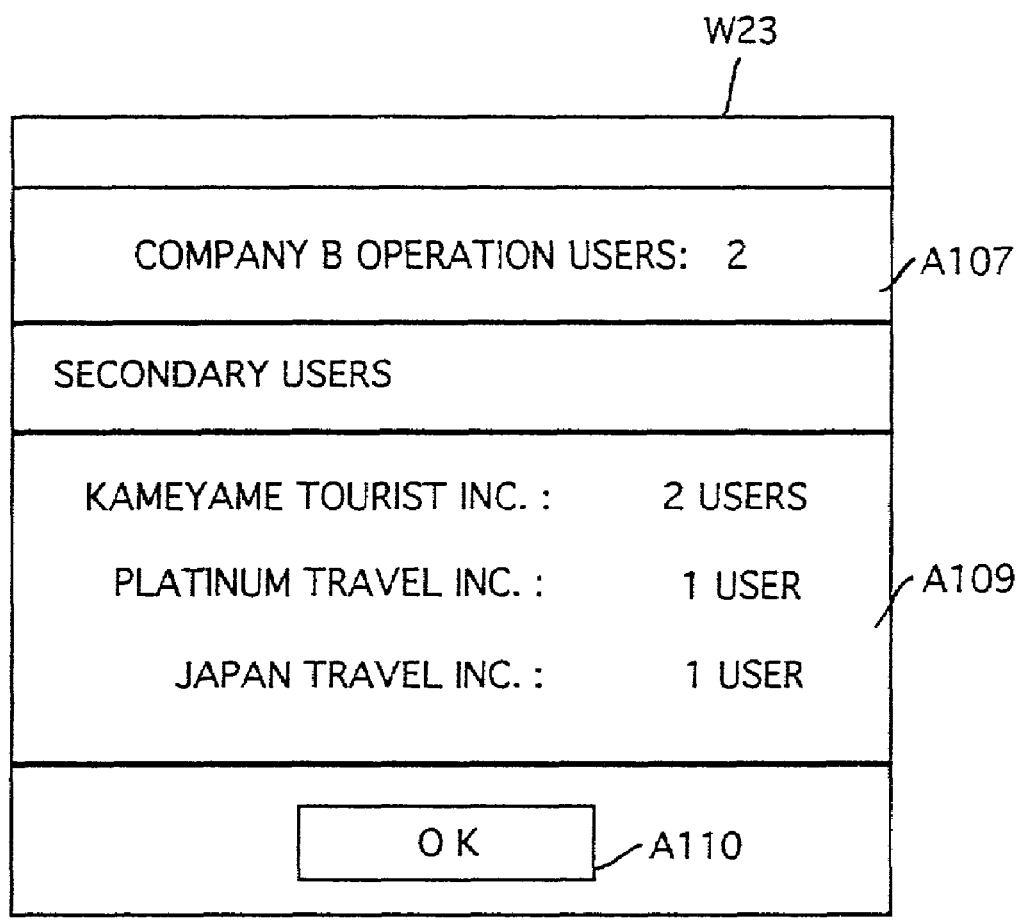

FIGS. 37 and 38 are flowcharts illustrating processing for settling accounts regarding an order, in which FIG. 37 illustrates processing executed by the center processing server 1 and FIG. 38 processing executed by the third client computer 11 installed at the sales agency. FIGS. 39 to 41 illustrate examples of windows displayed on the display unit of the third client computer 11 installed at the sales agency, FIGS. 42 to 44 illustrate examples of windows displayed on the display unit of the second client computer 20 installed at the photo lab, and FIG. 45 illustrates an example of a window displayed on the display unit of the first client computer 40 installed at the travel agency.

The utilization fee of the sales agency is calculated at the center processing server 1 by referring to the table for setting system services (step 121). The utilization fee of the sales agency includes the utilization fees of the photo lab and travel agency affiliated with the sales agency. Data indicative of the calculated utilization fee is transmitted from the center processing server 1 to the third client computer 11 installed at the sales agency (step 122).

The data indicative of the utilization fee is received at the third client computer 11, whereupon a utilization fee window W18 of the kind shown in FIG. 39 is displayed on the display screen of the display unit of third client computer 11.

The utilization fee window W18 includes an area A91 for displaying a basic utilization fee corresponding to the center processing server 1 of the sales agency, an area A92 indicating the current number of utilized kilobytes of the center processing server 1 and kilobyte unit price, an area A93 for displaying the utilization fee of the server, an area A94 for displaying the number of slave companies affiliated with the sales agency and the unit price of a maintenance fee, an area A96 for displaying the total of the user maintenance fee, and an area A97 for displaying the total amount of the invoice. The utilization fee window W18 further includes an area A95 for checking user specifics, a print area A98 and a confirm area A99.

If the confirm area A99 is clicked, a confirmation window W19 of the kind shown in FIG. 40 is displayed on the display unit of the third client computer 11. If the area A95 for checking user specifics is checked, a user-specifics confirmation window W20 is displayed on the display unit of the third client computer 11.

The confirm area W19 displays the utilization fee for every slave company affiliated with the sales agency. As shown in FIG. 40, the confirmation window W19 includes the following areas:

Area A100 for Display of Server Basic Utilization Fee:
This area displays the basic fee of the slave company for the purpose of utilizing the center processing server.

Area A101 for Display of Server Utilization Fee:
This area displays the number of kilobytes of the server utilized by the slave company, the kilobyte unit price and the utilization fee.

Area A102 for Display of User Fee:
This area displays the number of users affiliated with the photo lab, the unit price of the user maintenance fee and the total maintenance fee.

Area A103 for Display of Total Amount Due:
This area displays the amount for which the user is billed.

Log-off Area A104:
This area is clicked to log off.

OK Area A105:
This area is clicked when the result of confirmation is acceptable.

Print Area A106:
This area is clicked to print the content of the window W19.

The user-specifics confirmation window W20 shown in FIG. 41 includes a managed-user display area A107, a primary-user display area A108, a secondary-user display area A109 and an OK area A110. A primary user refers to a photo lab (e.g., the Company B Inc.) affiliated with the sales agency, and a secondary user refers to a company affiliated with a primary user.

If the OK area A105 in window W19 is clicked ("YES" at step 132), confirmatory message data to this effect is transmitted from the third client computer 11 to the center processing server 1 (step 133).

If the confirmatory message data from the third client computer 11 is received by the center processing server 1 (step 123), data indicating the utilization fee is transmitted to the second client computer 20 installed at the photo lab confirmed by the message data (step 124).

If data indicating the utilization fee is received by the second client computer 20 installed at the photo lab, a utilization-fee window W21 shown in FIG. 42 is displayed on the display unit of the second client computer 20.

The utilization-fee window W21 includes areas A91 to A97 similar to those of the confirmation window W19 shown in FIG. 39. The areas A91 to A97 display utilization fees of slave companies affiliated with the photo lab. The utilization-fee window W21 further includes an OK area A111.

If the OK area A111 is clicked, a window W22 of the kind shown in FIG. 43 is displayed on the display screen of the display unit 24 of second client computer 20. Areas in window W22 identical with those shown in window 40 of FIG. 40 are designated by like reference characters and need not be described again. The window W22 includes the following areas:

Area A114 for Display of Total Cost of Materials Creation:
This area displays the total amount of materials creation cost (i.e., fee for duplicating film).

Order-specifics Display Area A115:
This area displays the specifics of an order together with the fee.

Statement Download Area A116:
This area is clicked when a statement concerning the specifics of an order is to be downloaded from the center processing server 1.

Clicking the OK area A135 in window W22 causes confirmatory message data to be transmitted from the second client computer 20 to the center processing server 1.

If the confirmatory message data transmitted from the second client computer 20 is received by the center processing server 1 (step 125), the utilization fee of the travel agency is transmitted to the first client computer 40 installed at the travel agency (step 126).

When this occurs, a utilization fee window W24 of the kind shown in FIG. 45 is displayed on the display unit of the first client computer 40. Areas in window W24 identical with those shown in window W22 of FIG. 43 are designated by like reference characters and need not be described again.

If a confirmatory message is not received from the master company, utilization fee data is not transmitted to the slave company affiliated with this master company. Accordingly, if a utilization fee is erroneous, utilization fee data will not be transmitted to the slave company.

As many apparently widely different embodiments of the present invention can be made without departing from the spirit and scope thereof, it is to be understood that the invention is not limited to the specific embodiments thereof except as defined in the appended claims.

What is claimed is:

1. An image ordering system comprising:
   a center server;
   a first client computer for an orderer; and
   a plurality of second client computers for a laboratory,
      wherein said center server, said first client computer, and said plurality of second client computers are capable of communicating data with one another;
   said first client computer comprising:
      an input unit for inputting data that specifies an image to be printed; and
      a first transmitting unit for transmitting, to said center server, the image specifying data that is input from said input unit and data specifying the orderer;
   said center server comprising:
      a memory for storing correspondence data in advance, the correspondence data representing which of the plurality of second client computers is affiliated with the first client computer of the orderer;
      a first receiving unit for receiving the image specifying data and the orderer specifying data transmitted from said first transmitting unit of said first client computer;
      a determination unit for determining, on the basis of the correspondence data, which of the plurality of second client computers is affiliated with the orderer specified by the orderer data received by said first receiving unit;
      a second transmitting unit for transmitting the image specifying data and the orderer specifying data, which has been received by said first receiving unit, to one of said plurality of second client computers that has been determined by said determination unit in association with each other; and an image database for storing client images, wherein said one of said plurality of second client computers comprising:

a second receiving unit for receiving the image specifying data and the orderer specifying data transmitted from said second transmitting unit of said center server; and a first alerting unit for giving notice of information regarding an image specified by the image specifying data and of an orderer represented by the orderer specifying data, which items of data have been received by said second receiving unit, and wherein the data that specifies an image to be printed is matched to a client image stored in said image database.

2. The system according to claim 1, said center server further comprising:

a transmit controller for controlling said second transmitting unit to transmit the image data and the orderer specifying data to said second client computer that has been determined by said determination unit.

3. The system according to claim 1, wherein said center server further comprises an image database storing image data; and said first client computer includes a display controller for displaying, on a display unit, a thumbnail image of an image represented by image data that has been stored in said image database of said center server.

4. The system according to claim 1, wherein said center server further comprises:

a calculation unit which, on the basis of image specifying data received by said first receiving unit, calculates an estimate of a printing fee for printing an image specified by the image specifying data; and a third transmitting unit for transmitting, to said first client computer, data representing the estimate calculated by said calculation unit; and said first client computer further comprises:

a third receiving unit for receiving the estimate data transmitted from said third transmitting unit of said center server; and a second alerting unit for giving notice of the estimate represented by the estimate data received by said third receiving unit.

5. The system according to claim 1, wherein said center server further comprises:

a calculation unit for calculating a printing fee for printing the image; and a fifth transmitting unit for transmitting data representing the fee calculated by said calculation unit to at least one of said first client computer and one of said second client computers;

at least one of said first client computer and one of said second client computers further comprises:

a fifth receiving unit for receiving fee data transmitted from said fifth transmitting unit of said center server; and a second alerting unit for giving notice of the fee represented by the fee data received by said fifth receiving unit.

6. The system according to claim 5, wherein said first client computer and one of said second client computers each comprises:

a sixth receiving unit for receiving fee data transmitted from said fifth transmitting unit of said center server; and a third alerting unit for giving notice of a fee represented by the fee data received by said sixth receiving unit, said fifth transmitting unit of said center server transmitting data representing the fee calculated by said fee calculation unit to said first client computer after it transmits this data to one of said second client computers.

7. The system according to claim 5, wherein said fifth transmitting unit transmits fee data of orderers affiliated with said second client computers.

8. The system according to claim 5, wherein each of a plurality of agencies is provided with a third client computer for the agency;

laboratories affiliated with the agencies and orderers affiliated with the laboratories each being decided; and said fifth transmitting unit transmitting fee data to the third client computer of a corresponding agency, to one of said second client computers of the laboratory and to said first client computer of the orderer.

9. The system according to claim 8, wherein said fifth transmitting unit of said center server transmits the fee data to one of the second client computers of the laboratory after it transmits it to the third client computer of the agency;

said third client computer of the agency comprises:

a first verification unit for verifying a fee represented by fee data transmitted from said fifth transmitting unit of said center server; and a sixth transmitting unit for transmitting verification data to said center server in response to verification performed by said verification unit;

said center server further including a seventh receiving unit for receiving verification data transmitted from said third client computer of the agency; and said fifth transmitting unit transmitting the fee data to said one of the second client computers of the laboratory in response to reception of the verification data by said seventh receiving unit.

10. The system according to claim 8, wherein said fifth transmitting unit of said center server transmits the fee data to the first client computer of the orderer after it transmits it to one of the second client computers of the laboratory;

one of said second client computers of the laboratory further comprising:

a second verification unit for verifying a fee represented by fee data transmitted from said fifth transmitting unit of said center server; and a seventh transmitting unit for transmitting verification data to said center server in response to verification performed by said second verification unit, said center server including an eighth receiving unit for receiving verification data transmitted from said one of the second client computers of the laboratory;

said fifth transmitting unit transmitting the fee data to said first client computer of the orderer in response to reception of the verification data by said eighth receiving unit.

11. The system according to claim 1, wherein a third client computer for an agency is provided, said third client computer comprising:

a first setting unit for setting at least one of a laboratory affiliated with an agency and an orderer affiliated with a laboratory; and an eighth transmitting unit for transmitting attribute data, which has been set by said first setting unit, to said center server.

12. The system according to claim 1, wherein one of said client computers for laboratory further comprises:

a second setting unit for setting an orderer affiliated with a laboratory; and a ninth transmitting unit for transmitting attribute data, which has been set by said second setting unit, to said center server.

13. The system according to claim 1, wherein at least one client computer of the third client computer for the agency and one of the second client computers for the laboratory further comprises:

a third setting unit for setting a service, from among a plurality of services, that can be utilized by the orderer; and a tenth transmitting unit for transmitting data, which represents the service that has been set by said third setting unit, to said center server.

14. A center server comprising:

a memory for storing correspondence data in advance, the correspondence data representing which of a plurality of client computers for a laboratory is affiliated with a client computer of an orderer;

a receiving unit for receiving data specifying an image and data specifying an orderer transmitted from the client computer of the orderer;

a determination unit for determining, on the basis of the correspondence data, which one of the plurality of client computers for the laboratory is affiliated with the orderer specified by the orderer data received by said receiving unit;

a transmitting unit for transmitting the image specifying data and the orderer specifying data, which has been received by said receiving unit, to said one of the client computers for the laboratory that has been determined by said determination unit in association with each other; and an image database for storing client images, wherein the data specifying an image is matched to a client image stored in said image database.

15. In an image ordering, system comprising a center server, a first client computer for an orderer and a plurality of second client computers for a laboratory that are capable of communicating data with one another, an image ordering method comprising:

inputting data that specifies an image to be printed;

transmitting, to said center server, the image specifying data that is input and data specifying the orderer, wherein said first client computer implements said inputting data and transmitting to said center server;

storing correspondence data in advance, the correspondence data representing which of the plurality of second client computers is affiliated with the first client computer of the orderer;

receiving the image specifying data and the orderer specifying data transmitted from said first client computer;

determining, on the basis of the correspondence data, which of the plurality of second client computers is affiliated with the orderer specified by the orderer data received by said first receiving unit;

transmitting the received image specifying data and orderer specifying data to said second client computer that has been determined in association with each other;

wherein said center server implements said storing, said receiving the image specifying data, said determining, and said transmitting to said second client computer;

receiving the image specifying data and the orderer specifying data transmitted from said center server;

giving notice of information regarding an image specified by the received image specifying data and of an orderer represented by the received orderer specifying data, wherein said second client computer implements said receiving the image specifying data and the orderer specifying data transmitted from said center server and said giving notice of information; and searching an image database, which stores client images, and matching the received image specifying data to a client image stored in said image database.

16. A method of controlling operation of a center server, comprising:

storing correspondence data in advance, the correspondence data representing which of a plurality of client computers for a laboratory is affiliated with a client computer of an orderer;

receiving data specifying an image and data specifying an orderer transmitted from a first client computer of the orderer;

determining, on the basis of the correspondence data, which one of the plurality of client computers for the laboratory is affiliated with the orderer specified by the orderer data received by said receiving unit;

transmitting the received image specifying data and orderer specifying data to said one of the plurality of client computers for the laboratory in association with each other; and searching an image database, which stores client images, and matching the received image specifying data to a client image stored in said image database.

17. An image ordering system comprising:

a first client computer of an orderer;

a center server that communicates data with said first client computer, wherein said center server comprises:

a memory for storing correspondence data in advance, the correspondence data representing which of a plurality of second client computers for a laboratory is affiliated with the first client computer of the orderer;

a first receiving unit for receiving image specifying data and orderer specifying data transmitted from said first client computer;

a determination unit for determining, on the basis of the correspondence data, which of the plurality of second client computers is affiliated with the orderer specified by the orderer data received by said first receiving unit;

a second transmitting unit for transmitting the image specifying data and the orderer specifying data, which has been received by said first receiving unit, to one of said plurality of second client computers that has been determined by said determination unit; and an image database for storing client images, wherein the data specifying an image is matched to a client image stored in said image database.

18. The image ordering system according to claim 17, wherein said first client computer comprises:

an input unit for inputting data that specifies an image to be printed; and a first transmitting unit for transmitting, to said center server, the image specifying data that is input from said input unit and data specifying the orderer.

19. The image ordering system according to claim 17, wherein said one of the plurality of second client computers comprises:

a second receiving unit for receiving the image specifying data and the orderer specifying data transmitted from said second transmitting unit of said center server; and a first alerting unit for giving notice of information received by said second receiving unit, wherein said information includes at least one of an image specified by the image specifying data and of an orderer represented by the orderer specifying data.

20. An image ordering method for an image ordering system comprising a center server, a first client computer for an orderer and a plurality of second client computers for a laboratory that are capable of communicating data with one another, said image ordering method comprising:

transmitting data from said first client computer to said center server;

storing correspondence data in advance, wherein the correspondence data includes which of the plurality of second client computers is affiliated with the first client computer of the orderer;

receiving said data, at the center server, from said first client computer;

determining, on the basis of the correspondence data, which one of the plurality of second client computers is affiliated with the orderer specified by said data received by said first receiving unit;

transmitting said data from said center server to said one of the plurality of second client computers;

receiving said data transmitted from said center server at said one of the second client computers;

giving notice of information specified by said data; and searching an image database, which stores client images, and matching the received image specifying data to a client image stored in said image database.

21. The image ordering method according to claim 20, wherein said data comprises at least one of image specifying data and data specifying the orderer.

22. The image ordering method according to claim 20, wherein said information comprises at least one of an image specified by said data and of an orderer represented said data.

23. The image ordering system according to claim 1, wherein the correspondence data which represents which of the plurality of second client computers is affiliated with the first client computer of the orderer, comprises:

a management information database including at least one of a table of user names, a table of company names, a table of company—user link information, a table of company master—slave information, a table for setting system services, a table for setting printing services, an order table, a product table, and a table for specifying consignees.

24. The image ordering system according to claim 23, wherein at least two of the table of company names, the table of company—user link information, the table of company master—slave information, the table for setting system services, the table for setting printing services, are linked to each other by company identification (ID) data.

25. The image ordering system according to claim 23, wherein at least two of the table of user names, the table of company—user link information, and the order table are linked to each other by user identification (ID) data.

26. The image ordering system according to claim 23, wherein the table for setting printing services and the order table are linked to each other by service identification (ID) data.

27. The image ordering system according to claim 23, wherein the order table and the product table are linked to each other by product number data.

28. The image ordering system according to claim 23, wherein the order table and the table for specifying consignees are linked to each other by consignee service identification (ID) data.

29. The image ordering system according to claim 1, wherein the correspondence data which represents which of the plurality of second client computers is affiliated with the first client computer of the orderer, comprises:

master—slave relationships between a plurality of first client computers for orderers and said plurality of second client computers for the laboratory.

30. The image ordering system according to claim 29, wherein said master—slave relationships between a plurality of first client computers for orderers and said plurality of second client computers for the laboratory, comprise:

relationships between at least two of user name information, user identification information, company name information, company identification information, company—user link information, company master—slave information, system services information, printing services information, order tables, product tables, and consignee information.

31. The image ordering system according to claim 1, wherein said determination unit determines, using the correspondence data, whether one of the plurality of second client computers is affiliated with the orderer specified by the orderer data received by said first receiving unit; and wherein, if said determination unit determines, using the correspondence data, that one of the plurality of second client computers is affiliated with the orderer, then said second transmitting unit transmits the image specifying data and the orderer specifying data to said one of the plurality of second client computers determined to be affiliated with the orderer.

* * * * *